(12) United States Patent
Uematsu et al.

(10) Patent No.: US 8,989,969 B2
(45) Date of Patent: *Mar. 24, 2015

(54) TRACTION CONTROL APPARATUS

(71) Applicants: Koji Uematsu, Oyama (JP); Kazuhiro Hatake, Kanagawa (JP)

(72) Inventors: Koji Uematsu, Oyama (JP); Kazuhiro Hatake, Kanagawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,298

(22) Filed: Mar. 12, 2013

(65) Prior Publication Data
US 2013/0190992 A1 Jul. 25, 2013

Related U.S. Application Data

(63) Continuation of application No. 13/142,038, filed as application No. PCT/JP2009/071584 on Dec. 25, 2009, now Pat. No. 8,504,254.

(30) Foreign Application Priority Data

Jan. 8, 2009 (JP) ................................. 2009-002776

(51) Int. Cl.
B60T 8/175 (2006.01)
E02F 9/20 (2006.01)
F02D 29/02 (2006.01)
B60T 8/1769 (2006.01)

(52) U.S. Cl.
CPC ............... *E02F 9/2083* (2013.01); *B60T 8/175* (2013.01); *F02D 29/02* (2013.01); *B60T 8/1769* (2013.01); *B60T 2210/16* (2013.01); *B60T 2270/202* (2013.01)
USPC ................. 701/50; 701/83; 701/90; 180/197; 303/144; 303/163

(58) Field of Classification Search
CPC ....................................................... E02F 9/2083
USPC ................. 701/50, 69–71, 74–75, 78, 82–83, 701/89–90; 180/197, 233, 244; 303/139, 303/144, 151, 163, 165, 113.2
See application file for complete search history.

(56) References Cited

U.S. PATENT DOCUMENTS 4,720,794 A 1/1988 Skarvada
4,912,744 A 3/1990 Hurst
(Continued)

FOREIGN PATENT DOCUMENTS

CN 1478685 A 3/2004
DE 3931210 A1 4/1997
(Continued)

OTHER PUBLICATIONS

Notice of Reason(s) for Rejection dated Jan. 15, 2013 from Japanese Application No. 2012-109992, including English translation, 5 pages.
(Continued)

*Primary Examiner* — Thomas G Black
*Assistant Examiner* — Ce Li
(74) *Attorney, Agent, or Firm* — Fish & Richardson P.C.

(57) ABSTRACT

An object of the invention is to provide a traction control apparatus capable of suitably controlling an error, if it occurs, between an estimation of a vehicle speed and an actual vehicle speed. A traction control apparatus according to the invention includes a vehicle speed estimator and a driving-force controller. The traction control apparatus includes a vehicle state determiner that determines whether the vehicle speed of the construction vehicle estimated by the vehicle speed estimator and the driving-force control by the driving-force controller are balanced, and a driving-force control changer that changes a driving-force control by the driving-force controller when the vehicle state determiner determines the vehicle speed and the driving-force control to be unbalanced.

7 Claims, 16 Drawing Sheets

(56) References Cited

U.S. PATENT DOCUMENTS

| | | | |
|---|---|---|---|
| 5,073,865 A | 12/1991 | Togai et al. | |
| 5,083,631 A * | 1/1992 | Nakayama et al. | 180/197 |
| 5,207,483 A * | 5/1993 | Shimada et al. | 303/148 |
| 5,241,479 A | 8/1993 | Matsuda et al. | |
| 5,320,422 A | 6/1994 | Tsuyama et al. | |
| 5,353,225 A | 10/1994 | Tsuyama et al. | |
| 5,365,443 A * | 11/1994 | Tsuyama et al. | 701/83 |
| 5,428,539 A | 6/1995 | Kawamura et al. | |
| 5,456,526 A | 10/1995 | Iwasa et al. | |
| 5,456,641 A | 10/1995 | Sawase | |
| 5,469,359 A * | 11/1995 | Tsuyama et al. | 701/90 |
| 5,535,124 A * | 7/1996 | Hosseini et al. | 701/83 |
| 5,636,121 A | 6/1997 | Tsuyama et al. | |
| 5,719,770 A * | 2/1998 | Matsuno | 701/71 |
| 5,737,714 A | 4/1998 | Matsuno et al. | |
| 5,913,377 A | 6/1999 | Ota et al. | |
| 5,944,392 A | 8/1999 | Tachihata et al. | |
| 5,957,550 A | 9/1999 | Watanabe | |
| 6,122,585 A | 9/2000 | Ono et al. | |
| 6,185,920 B1 | 2/2001 | Oxley | |
| 6,205,379 B1 | 3/2001 | Morisawa et al. | |
| 6,208,929 B1 | 3/2001 | Matsuno et al. | |
| 6,269,297 B1 | 7/2001 | Hosomi et al. | |
| 6,463,378 B2 | 10/2002 | Nishio | |
| 6,471,306 B2 * | 10/2002 | Irie | 303/190 |
| 6,568,763 B2 | 5/2003 | Uematsu et al. | |
| 6,575,023 B2 | 6/2003 | Ohashi et al. | |
| 6,584,399 B2 | 6/2003 | Koibuchi | |
| 6,598,945 B2 | 7/2003 | Shimada et al. | |
| 6,631,320 B1 | 10/2003 | Holt et al. | |
| 6,650,989 B2 | 11/2003 | Gronau et al. | |
| 6,671,598 B2 | 12/2003 | Laurent | |
| 6,719,082 B2 | 4/2004 | Uematsu et al. | |
| 6,913,326 B1 | 7/2005 | Ohkubo et al. | |
| 6,923,514 B1 * | 8/2005 | Spieker et al. | 303/199 |
| 6,932,180 B2 | 8/2005 | Matsuno et al. | |
| 6,959,241 B2 | 10/2005 | Itow et al. | |
| 7,016,776 B2 | 3/2006 | Elie et al. | |
| 7,152,935 B2 | 12/2006 | Kinder et al. | |
| 7,276,014 B2 | 10/2007 | Goto et al. | |
| 7,337,047 B2 * | 2/2008 | Ueno et al. | 701/38 |
| 7,398,145 B2 | 7/2008 | Kato et al. | |
| 7,444,222 B2 | 10/2008 | Villella et al. | |
| 7,445,142 B2 | 11/2008 | Salani et al. | |
| 7,562,947 B2 | 7/2009 | Katada et al. | |
| 7,599,779 B2 | 10/2009 | Watanabe et al. | |
| 7,770,681 B2 | 8/2010 | Marathe et al. | |
| 7,979,189 B2 | 7/2011 | Nihei | |
| 8,301,354 B2 * | 10/2012 | Doi | 701/91 |
| 2001/0003805 A1 * | 6/2001 | Koibuchi | 701/9 |
| 2001/0013439 A1 | 8/2001 | Irie | |
| 2001/0027144 A1 | 10/2001 | Murakami et al. | |
| 2002/0007243 A1 | 1/2002 | Yamaguchi | |
| 2002/0010535 A1 | 1/2002 | Nishio | |
| 2002/0033292 A1 | 3/2002 | Uematsu et al. | |
| 2002/0047300 A1 | 4/2002 | Uematsu et al. | |
| 2003/0018425 A1 | 1/2003 | Gronau | |
| 2003/0089547 A1 | 5/2003 | Schenkel et al. | |
| 2003/0141128 A1 | 7/2003 | Hessmert et al. | |
| 2003/0149515 A1 | 8/2003 | Hessmert et al. | |
| 2003/0150660 A1 | 8/2003 | Ohtsu | |
| 2004/0046448 A1 | 3/2004 | Brown | |
| 2004/0088103 A1 | 5/2004 | Itow et al. | |
| 2005/0029754 A1 * | 2/2005 | Ueno et al. | 280/5.502 |
| 2005/0055149 A1 | 3/2005 | Kato et al. | |
| 2005/0075827 A1 | 4/2005 | Tsuruhara et al. | |
| 2005/0251316 A1 | 11/2005 | Kato et al. | |
| 2006/0015239 A1 | 1/2006 | Higuchi | |
| 2007/0155404 A1 | 7/2007 | Yamane et al. | |
| 2007/0213899 A1 | 9/2007 | Watanabe et al. | |
| 2008/0105479 A1 * | 5/2008 | Nishiike et al. | 180/197 |
| 2008/0120003 A1 | 5/2008 | Nihei | |
| 2008/0154472 A1 * | 6/2008 | Okuda et al. | 701/93 |
| 2008/0164664 A1 | 7/2008 | Anderson et al. | |
| 2008/0177495 A1 | 7/2008 | Gold | |
| 2008/0245591 A1 * | 10/2008 | Sjogren | 180/197 |
| 2011/0035130 A1 | 2/2011 | Noguchi et al. | |
| 2011/0246031 A1 | 10/2011 | Uematsu et al. | |
| 2011/0251762 A1 | 10/2011 | Uematsu et al. | |
| 2011/0257847 A1 | 10/2011 | Uematsu et al. | |
| 2011/0257851 A1 | 10/2011 | Uematsu et al. | |
| 2011/0257861 A1 | 10/2011 | Uematsu et al. | |
| 2011/0270497 A1 * | 11/2011 | Uematsu et al. | 701/50 |
| 2012/0041651 A1 | 2/2012 | Uematsu et al. | |

FOREIGN PATENT DOCUMENTS

| | | |
|---|---|---|
| DE | 10103467 A1 | 8/2001 |
| EP | 0342789 A2 | 11/1989 |
| EP | 0992411 A2 | 4/2000 |
| EP | 1 396 402 A1 | 3/2004 |
| GB | 2 270 354 A | 3/1994 |
| GB | 2291974 A | 2/1996 |
| JP | S59-093560 A | 5/1984 |
| JP | S62-196442 A | 8/1987 |
| JP | S64-030866 A | 2/1989 |
| JP | H01-145242 A | 6/1989 |
| JP | H02-038172 A | 2/1990 |
| JP | H02-095927 A | 4/1990 |
| JP | H02-114052 A | 4/1990 |
| JP | H03-132461 A | 6/1991 |
| JP | H04-55158 A | 2/1992 |
| JP | H05-016686 A | 1/1993 |
| JP | H05-187284 A | 7/1993 |
| JP | H06-511215 A | 12/1994 |
| JP | H08-014075 A | 1/1996 |
| JP | H08-258588 A | 10/1996 |
| JP | H09-086367 A | 3/1997 |
| JP | H09-290729 A | 11/1997 |
| JP | H10-029524 A | 2/1998 |
| JP | H10-230837 A | 9/1998 |
| JP | H11-115719 A | 4/1999 |
| JP | 2000-344082 A | 12/2000 |
| JP | 2000-344084 A | 12/2000 |
| JP | 2001-082199 A | 3/2001 |
| JP | 2001-122099 A | 5/2001 |
| JP | 2001-219838 A | 8/2001 |
| JP | 2001-277896 A | 10/2001 |
| JP | 2002-029401 A | 1/2002 |
| JP | 2002-029402 A | 1/2002 |
| JP | 2002-087095 A | 3/2002 |
| JP | 2003-104186 A | 4/2003 |
| JP | 2003-237398 A | 8/2003 |
| JP | 2004-175347 A | 6/2004 |
| JP | 2004-517314 A | 6/2004 |
| WO | 93/07037 A1 | 4/1993 |
| WO | 02/49896 A | 6/2002 |
| WO | 2005/015060 A1 | 2/2005 |
| WO | WO2007046736 A1 | 4/2007 |
| WO | 2010/074225 A1 | 7/2010 |
| WO | 2010/074226 A1 | 7/2010 |
| WO | 2010/074227 A1 | 7/2010 |
| WO | 2010/079704 A1 | 7/2010 |
| WO | 2010/079705 A1 | 7/2010 |

OTHER PUBLICATIONS

International Search Report from International Application No. PCT/JP2009/071581, dated Feb. 23, 2010, 2 pages.

International Search Report from International Application No. PCT/JP2009/071582, dated Feb. 9, 2010, 1 page.

International Search Report from International Application No. PCT/JP2009/071583, dated Feb. 9, 2010, 1 page.

International Search Report from International Application No. PCT/JP2009/071584, dated Feb. 9, 2010, 2 pages.

International Search Report from International Application No. PCT/JP2009/071585, dated Apr. 13, 2010, 2 pages.

Non-final Office Action dated Feb. 16, 2012 in U.S. Appl. No. 13/175,107, 16 pages.

Notice of Allowance dated Oct. 9, 2012 in U.S. Appl. No. 13/175,107, 15 pages.

(56) References Cited

OTHER PUBLICATIONS

Notice of Reason(s) for Rejection issued Mar. 13, 2012 in Japanese Patent Application No. JP 2010-545726, including English Translation, 5 pages.
European Search Report dated Nov. 7, 2012 from European Application No. 09837590.0, 6 pages.
Supplementary European Search Report dated Nov. 16, 2012 from European Application No. 98 03 5022, 4 pages.
Non-final Office Action dated Feb. 14, 2013 in U.S. Appl. No. 13/172,383, 29 pages.
Non-final Office Action dated Nov. 26, 2012 in U.S. Appl. No. 13/142,038, 23 pages.
Non-final Office Action dated Aug. 30, 2012 in U.S. Appl. No. 13/140,664, 30 pages.
Notice of Allowance dated Jan. 24, 2013 in U.S. Appl. No. 13/140,664, 7 pages.
Non-final Office Action dated Oct. 3, 2012 in U.S. Appl. No. 13/140,537, 27 pages.
Non-final Office Action dated Feb. 14, 2013 in U.S. Appl. No. 13/142,053, 30 pages.
Search Report issued in corresponding European patent application No. 09837589.2 on Dec. 11, 2013, 6 pages.
Office Action issued Sep. 18, 2014 for the corresponding European patent application No. 09837589.2, 4 pages.
Office Action issued Mar. 17, 2014 in corresponding Chinese Patent Application No. 201310065174.1, including partial English translation, 6 pages.

* cited by examiner

TRACTION CONTROL APPARATUS

CROSS REFERENCE TO RELATED APPLICATIONS

This application is a continuation of U.S. application Ser. No. 13/142,038, which application is a U.S. National Stage application of International Application No. PCT/JP2009/071584 filed on Dec. 25, 2009, which application claims priority to Japanese Application No. 2009-002776 filed on Jan. 8, 2009. The entire contents of the above applications are incorporated herein by reference in their entireties.

TECHNICAL FIELD

The present invention relates to a traction control apparatus.

BACKGROUND ART

Typically, vehicles such as automobiles are occasionally installed with a traction control apparatus and the like to prevent drive slip. There has been known that, when an acceleration operation, a low-μ-road driving or the like causes drive slip, such a traction control apparatus performs a braking control of a brake and driving control of an engine to generate appropriate traction on wheels, thereby preventing wheel slip.

When the traction control apparatus is installed in a two-wheel-drive car, a vehicle speed can easily be estimated by detecting rotation speeds of driven wheels (not driving wheels) by a sensor and the like.

However, since all wheels of all-wheel-drive vehicles such as a four-wheel-car are driving wheels, all the wheels may generate drive slip. Accordingly, it is difficult to accurately estimate a vehicle speed only by detecting rotation speeds of all the wheels.

For this reason, there has been proposed a technique for estimating a vehicle speed of such an all-wheel-drive vehicle installed with a rotation speed sensor for wheels and an acceleration sensor, the technique including selecting a select wheel to be referred based on a rotation speed of each of the wheels by the rotation speed sensor and estimating the vehicle speed based on an output from the acceleration sensor (see, for instance, Patent Literature 1).

CITATION LIST

Patent Literature

Patent Literature 1: JP-A-2001-82199

SUMMARY OF THE INVENTION

Problems to be Solved by the Invention

The technique disclosed in the Patent Literature 1 presupposes a convergence of slip that is determined under the condition that the rotation speed of each of the wheels is within a predetermined deviation from a target rotation speed. However, a construction vehicle such as a dump truck is assumed to drive on an irregular ground. Since road conditions on the ground constantly change and conditions of the wheels (e.g., currently slipping or slippery) also constantly change, a vehicle speed cannot be estimated with high accuracy due to such a large disturbance.

Accordingly, when a vehicle keeps on slipping and acceleration integration is kept for a long time, acceleration errors are accumulated over time, so that errors of an estimated vehicle speed are increased.

When the vehicle speed is overestimated than an actual vehicle speed, the vehicle is judged to be skidding less than it is actually skidding and a braking control amount by a traction control apparatus is decreased to cause a larger slip.

On the other hand, when the vehicle speed is underestimated than an actual vehicle speed, the vehicle is judged to be skidding more than it is actually skidding and a braking control amount by the traction control apparatus is increased to hamper a driving at an inherently available vehicle speed.

In other words, when such an erroneously estimated vehicle speed and a driving-force control are kept balanced, an appropriate driving force is unobtainable.

An object of the invention is to provide a traction control apparatus capable of suitably controlling an error, if it occurs, between an estimation of a vehicle speed and an actual vehicle speed.

Means for Solving the Problems

A traction control apparatus for an all-wheel-drive construction vehicle according to an aspect of the invention includes: a vehicle speed estimator that estimates a vehicle speed, the vehicle speed estimator comprising a rotation speed detector that detects a rotation speed of each of wheels and a reference wheel-speed calculator that calculates a reference wheel-speed based on the rotation speed detected by the rotation speed detector; a driving-force controller that performs a driving-force control of the construction vehicle based on the vehicle speed estimated by the vehicle speed estimator; a vehicle state determiner that determines whether or not the vehicle speed of the construction vehicle estimated by the vehicle speed estimator and the driving-force control by the driving-force controller are balanced; and a driving-force control changer that changes a driving-force control by the driving-force controller when the vehicle state determiner determines that the vehicle speed and the driving-force control are unbalanced.

According to the above aspect of the invention, when the vehicle speed estimated by the vehicle speed estimator and the driving-force control by the driving-force controller are determined to be unbalanced, the driving-force control changer changes the driving-force control, so that errors in the estimated vehicle speed can be kept from accumulating and an appropriate control by the traction control apparatus can be recovered.

In the traction control apparatus according to the aspect of the invention, it is preferable that the driving-force controller includes a braking mechanism controller that controls a braking mechanism of the construction vehicle, in which the braking mechanism controller calculates a slip ratio of each of the wheels based on the rotation speed detected by the rotation speed detector and controls the braking mechanism so that the calculated slip ratio converges to a predetermined target value, and the vehicle state determiner determines the vehicle speed and the driving-force control to be unbalanced when the slip ratio calculated by the braking mechanism controller exceeds the target value and is kept at a predetermined threshold or more for a predetermined time or more.

With this arrangement, during control by the traction control apparatus, the braking mechanism controller controls the braking mechanism so that the slip ratio converges to the predetermined target value. Accordingly, when the slip ratio is kept at the predetermined threshold or more for the predetermined time or more, it is determined that the vehicle speed is erroneously estimated and the braking mechanism control is balanced with the erroneously estimated vehicle speed. In such a case, changing the driving-force control by the driving-force control changer can avoid such an unbalance and allows the traction control apparatus to recover to an appropriate control.

In the traction control apparatus according to the aspect of the invention, it is preferable that the vehicle state determiner determines the vehicle speed and the driving-force control to be unbalanced when a braking control amount of the braking mechanism by the braking mechanism controller is kept at a predetermined threshold or more for a predetermined time or more.

With this arrangement, during control by the traction control apparatus, the braking control amount of the braking mechanism kept at the predetermined threshold or more and not recovered even after the predetermined time or more is considered to be caused by the erroneous estimation of the vehicle speed and unbalance between the driving-force control the erroneously estimated vehicle speed. Accordingly, changing the driving-force control by the driving-force control changer can avoid such an unbalance and allows the traction control apparatus to recover to an appropriate control.

In the traction control apparatus according to the aspect of the invention, it is preferable that the vehicle state determiner determines the vehicle speed and the driving-force control to be unbalanced when the slip ratios of right and left ones of the wheels calculated by the braking mechanism controller are both at a predetermined threshold or less, and the braking control amount of the braking mechanism by the braking mechanism controller is kept at the predetermined threshold or more for the predetermined time or more.

With this arrangement, the slip ratio of the predetermined threshold or less and the braking control amount kept at the predetermined threshold or more for the predetermined time are considered to be caused by the erroneously estimated vehicle speed. Accordingly, changing the driving-force control by the driving-force control changer can avoid such an unbalance and allows the traction control apparatus to recover to an appropriate control.

In the traction control apparatus according to the aspect of the invention, it is preferable that the construction vehicle is the articulate-type dump truck, the articulate angle detector that detects the articulate angle of the construction vehicle is provided, and the vehicle state determiner includes a first threshold changing section that changes at least one of the threshold of the slip ratio, the threshold of the braking control amount and an elapsed time for determination in accordance with the detected articulate angle.

With this arrangement, since the vehicle state determiner includes the first threshold changing section, the thresholds and the elapsed time for determination are changed in accordance with a steering angle of the construction vehicle detected as the articulate angle, so that the vehicle state determiner can determine whether the vehicle state is balanced in accordance with a driving condition.

In the traction control apparatus according to the aspect of the invention, it is preferable that the construction vehicle is the articulate-type dump truck, the articulate angle detector that detects the articulate angle of the construction vehicle is provided, and the vehicle state determiner includes a second threshold changing section that changes at least one of the threshold of the slip ratio, the threshold of the braking control amount and an elapsed time for determination in accordance with the detected articulate angle.

With this arrangement, since the vehicle state determiner includes the second threshold changing section, the thresholds and the elapsed time for determination are changed in accordance with a steering operational speed of the construction vehicle detected as the change amount of the articulate angle per unit time, so that the vehicle state determiner can also determine whether the vehicle state is balanced in accordance with a driving condition.

In the traction control apparatus according to the aspect of the invention, it is preferable that the vehicle state determiner determines the vehicle speed and the driving-force control to be unbalanced when at least one of conditions is satisfied, the conditions including: that the braking control amount of the right and left ones of the wheels by the braking mechanism controller is the predetermined threshold or more; that a total value of the braking control amount of the right and left ones of the wheels is a predetermined threshold value or more, that a total value of the braking control amounts of all the wheels is a predetermined threshold or more; and that a total value of a lager one of the braking control amounts of the right and left front ones of the wheels disposed in a front travel direction and a lager one of the braking control amounts of the right and left ones of the wheels disposed backward from the front wheels and braked by the braking mechanism is a predetermined value.

With this arrangement, since the braking control amount by the braking mechanism controller is determined to be excessively large under the above conditions, changing the driving-force control by the driving-force control changer can avoid such an unbalance and allow the traction control apparatus to recover to an appropriate control.

In the traction control apparatus according to the aspect of the invention, it is preferable that the driving-force control changer changes a driving-force control by setting the vehicle speed estimated by the vehicle speed estimator at the reference wheel speed calculated by the reference wheel-speed calculator.

With this arrangement, when the vehicle state determiner determines the vehicle state to be unbalanced, the driving-force control changer sets the estimated vehicle speed at the reference wheel speed calculated by the reference wheel-speed calculator to increase the estimated vehicle speed, so that the calculated slip ratio is decreased to lessen the braking control amount by the braking mechanism controller.

In the traction control apparatus according to the aspect of the invention, it is preferable that the driving-force control changer changes a driving-force control by releasing the control by the driving-force controller.

With this arrangement, when the vehicle state determiner determines the vehicle state to be unbalanced, the driving-force control changer releases the control by the driving-force controller, so that an inappropriate control by the traction control apparatus can be avoided.

DESCRIPTION OF THE EXEMPLARY EMBODIMENT(S)

Exemplary embodiment(s) of the invention will be described below with reference to the attached drawings.

1. Structure of Dump Truck 1

Figure 1:
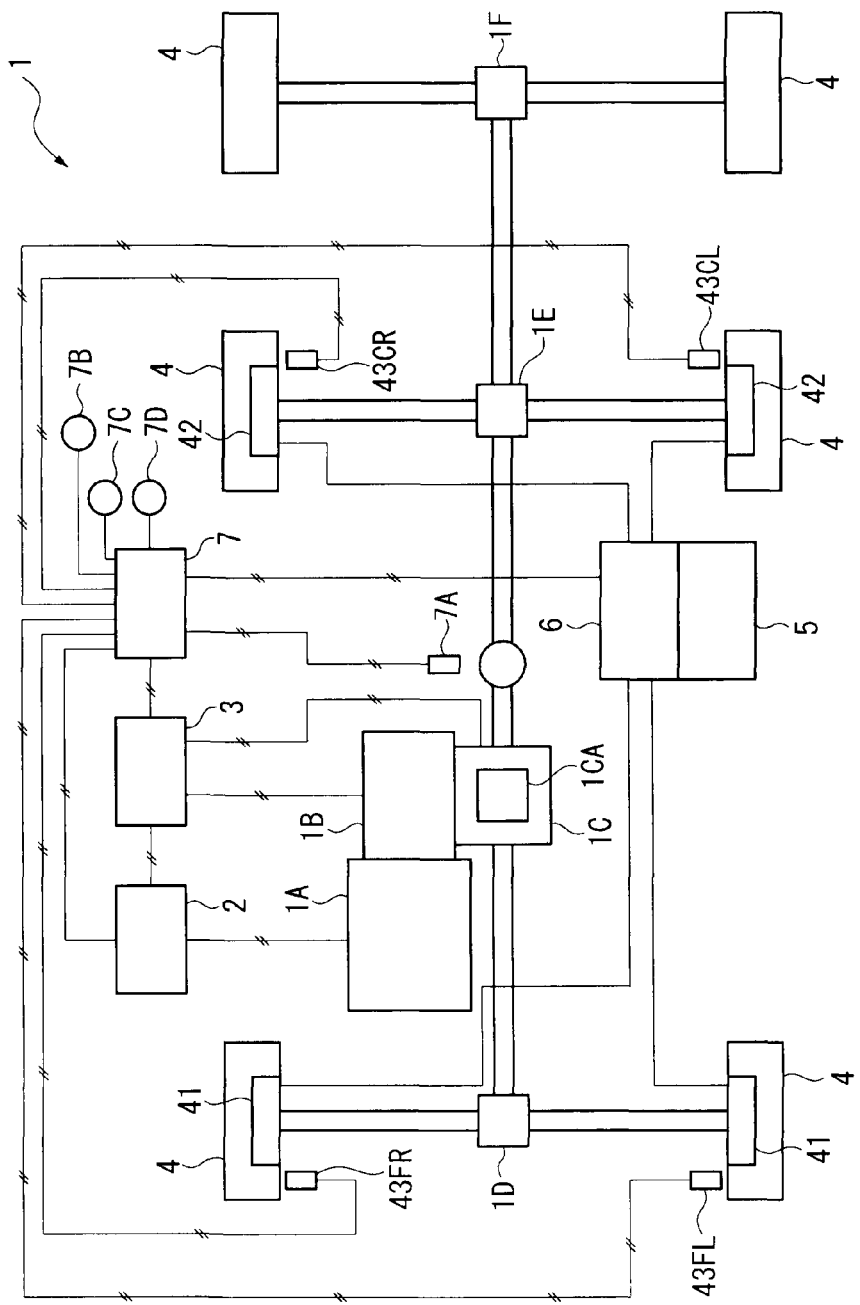
FIG. 1 is a schematic view showing a structure of a construction vehicle according to an exemplary embodiment of the invention.

FIG. 1 shows a dump truck 1 according to an exemplary embodiment of the invention. The dump truck 1 is an articulated truck that includes separate front and rear vehicle body frames. A vehicle body of the dump truck 1 includes an engine 1A, a transmission 1B, differential mechanisms 1C to 1F and a differential adjusting mechanism 1CA. The output of the engine 1A is controlled by an engine controller 2, and is transmitted to the transmission 1B. The transmission 1B includes a torque converter (not shown). A transmission controller 3 performs gear-shift control on the transmission 1B.

A rotary driving force transmitted from the engine 1A to the transmission 1B rotates all wheels 4 via the differential mechanisms 1C to 1F and is transmitted to a road surface.

In this exemplary embodiment, the differential mechanism 1C is provided with the differential adjusting mechanism 1CA, so that a differential of the differential mechanism 1C can be restrained by the differential adjusting mechanism 1CA. The differential mechanisms 1D and 1E are arranged to accept only the differentials of the right and left wheels. Thus, the differential mechanism 1E is in a so-called direct connection in which the differentials of the front and rear wheels are not acceptable.

The wheels 4 in the vehicle body are provided with front brakes 41 and center brakes 42. The front brakes 41 and the center brakes 42 are hydraulically connected to a brake hydraulic circuit 5 and a TCS control hydraulic circuit 6 (see FIG. 2).

Figure 2:
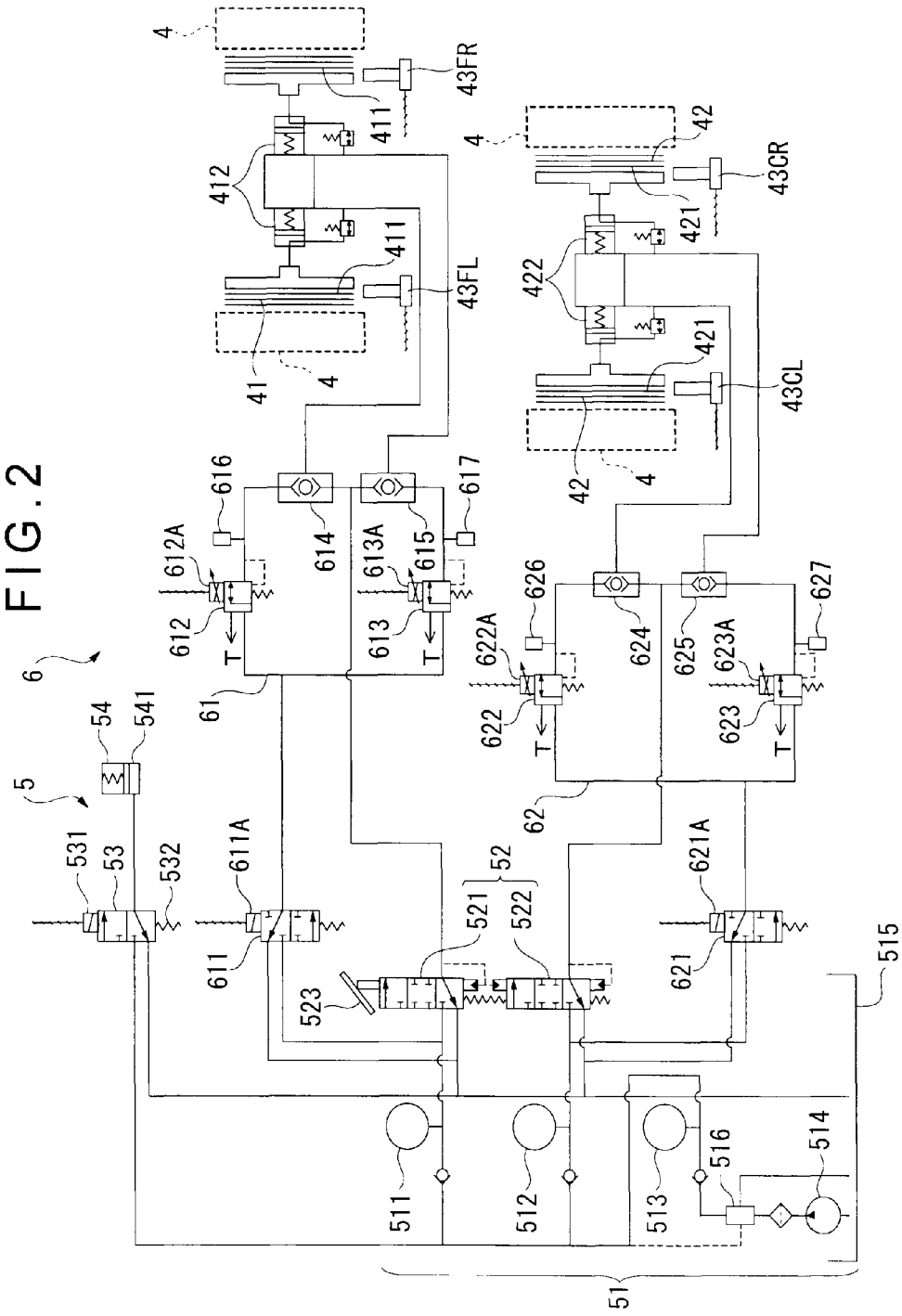
FIG. 2 is a hydraulic circuit diagram of the construction vehicle according to the exemplary embodiment.

A braking mechanism includes the front brakes 41, the center brakes 42, the brake hydraulic circuit 5 and the TCS control hydraulic circuit 6 (see FIG. 2).

The wheels 4 are respectively provided with rotation speed sensors (i.e., rotation speed detectors) 43FL, 43FR, 43CL and 43CR (which are described later in detail) for detecting the rotation speeds of the wheels 4. A rotation speed signal detected by each of the rotation speed sensors 43FL, 43FR, 43CL and 43CR is output to a TCS controller 7 as an electrical signal.

The TCS controller 7 includes: an articulate angle sensor 7A for detecting an articulate angle (bending angle) of the dump truck 1; and an acceleration sensor (acceleration detector) 7D for detecting acceleration applied in a front and rear direction of the dump truck 1. The articulate angle detected by the articulate angle sensor 7A and the acceleration detected by the acceleration sensor 7D are output to the TCS controller 7 as electrical signals.

A TCS system switch 7B for cancelling TCS control is electrically connected to the TCS controller 7.

The TCS controller 7 controls the brake torques of the front brakes 41 and the center brakes 42 via the hydraulic circuits 5 and 6 and performs an inter-axle differential control for adjusting the differential restraining force of the differential adjusting mechanism 1CA. The TCS controller 7 also functions as a controller for retarder control. The TCS controller 7 performs the retarder control in accordance with an operation signal from a retarder control lever 7C used for setting a retarder speed.

2. Structure of Brake Hydraulic Circuit 5

FIG. 2 shows the brake hydraulic circuit 5 of the dump truck 1. In this exemplary embodiment, the front brakes 41 and the center brakes 42 include multi-disc brakes 411 and 421 and slack adjusters 412 and 422, respectively. The slack adjusters 412 and 422 are hydraulically connected to the brake hydraulic circuit 5 and the TCS control hydraulic circuit 6.

All the front brakes 41 and the center brakes 42 are hydraulically controlled, so that when pressure oil is discharged from the brake hydraulic circuit 5, the discharged pressure oil is supplied to related portions of the front brakes 41 and the center brakes 42 via the TCS control hydraulic circuit 6, thereby hydraulically driving the related portions.

The slack adjusters 412 and 422 are devices capable of automatically adjusting gaps resulting from abrasion of the front brakes 41 and the center brakes 42.

The brake hydraulic circuit 5 includes a hydraulic supply system 51, a foot brake valve 52 and a parking brake valve 53.

The hydraulic supply system 51 includes a plurality of hydraulic accumulators 511, 512 and 513 as hydraulic sources, a hydraulic pump 514 and a reservoir 515. Pressure oil is supplied from the hydraulic accumulators 511, 512 and 513 to the front brakes 41 and the center brakes 42 via the TCS control hydraulic circuit 6, thereby braking the wheels 4.

Each of the hydraulic accumulators 511, 512 and 513 receives the pressure oil in the reservoir 515, the pressure of which is boosted with the assistance of the hydraulic pump 514 driven by the engine 1A (driving source), to accumulate a predetermined pressure. When the predetermined pressure is obtained, an unload device 516 disposed between the hydraulic pump 514 and the hydraulic accumulator 513 unloads the pressure oil from the hydraulic pump 514.

The foot brake valve 52 includes a front brake valve 521 and a center brake valve 522. When a brake pedal 523 is operated, the front brake valve 521 and the center brake valve 522 respectively supply the pressure oil of the hydraulic accumulators 511 and 512 to the front brakes 41 and the center brakes 42 for braking.

Specifically, when the brake pedal 523 is operated, the position of the spool of the front brake valve 521 is shifted and the pressure oil of the hydraulic accumulator 511 is discharged from the front brake valve 521. The pressure oil is supplied to the front brakes 41 via a front hydraulic circuit 61 in the TCS control hydraulic circuit 6 to effect the braking of the front brakes 41.

More specifically, the pressure oil discharged from the front brake valve 521 acts on the right and left front brakes 41 with a substantially equal pressure via shuttle valves 614 and 615, thereby equally performing the braking on the right and left sides.

The pressure oil discharged from the center brake valve 522 acts on the right and left center brakes 42 with a substantially equal pressure via shuttle valves 624 and 625, thereby equally performing the braking on the right and left sides.

Simultaneously, the position of the spool of the center brake valve 522 is shifted, so that the pressure oil of the hydraulic accumulator 512 is discharged from the center brake valve 522. The pressure oil is supplied to the center brake 42 via a center hydraulic circuit 62 to effect the braking of the center brakes 42.

The parking brake valve 53 is a valve for controlling a parking brake 54. The parking brake valve 53 includes a solenoid 531 and a spring 532. When a parking switch disposed in an operation room (not shown) is switched to a parking position, and thus, the position of the parking brake valve 53 is shifted with the assistance of the solenoid 531, the parking brake valve 53 supplies pressure oil in the hydraulic accumulator 513 to a cylinder chamber 541 of the parking brake 54, thereby increasing a parking brake pressure. As a result, when the vehicle is parted, the braking condition is maintained.

Although shown in the upper left in FIG. 2, practically, the parking brake 54 is provided in parallel with the front brakes 41 or the center brakes 42, or is provided to a brake attached to a drive shaft that transmits a driving force.

When the vehicle travels, a parking switch (not shown) is switched to a travel position, and thus, the position of the parking brake valve 53 is shifted to a position where the pressure oil from the hydraulic accumulator 513 is blocked, and directs the pressure oil in a cylinder chamber 541 of the parking brake 54 back to the reservoir 515 of the hydraulic supply system 51, thereby reducing a parking brake pressure to zero. As a result, when the vehicle travels, the vehicle is movable.

3. Structure of TCS Control Hydraulic Circuit 6

As shown in FIG. 2, the TCS control hydraulic circuit 6 is disposed in the middle of a hydraulic circuit extending from the brake hydraulic circuit 5 to the front brakes 41 and the center brakes 42. The TCS control hydraulic circuit 6 includes a front hydraulic circuit 61 and a center hydraulic circuit 62.

The front hydraulic circuit 61 is a hydraulic circuit configured to perform the TCS control on the front brakes 41. The front hydraulic circuit 61 includes a front TCS switching valve 611, two solenoid proportional control valves 612 and 613, the two shuttle valves 614 and 615 and pressure sensors 616 and 617.

The front TCS switching valve 611 is capable of switching whether or not to perform the TCS brake control on the front brakes 41 in response to an electric signal output from the TCS controller 7 to a solenoid 611A of the switching valve 611.

The solenoid proportional control valves 612 and 613 are control valves that are respectively disposed on pipe lines branched in the middle of a pipe line having an end connected to the output side of the front TCS switching valve 611. The solenoid proportional control valves 612 and 613 are configured to control the brake pressure of the front brakes 41 during the TCS control. The solenoid proportional control valve 612 is a valve configured to control pressure oil supply to the left one of the front brakes 41. The solenoid proportional control valve 613 is a valve configured to control pressure oil supply to the right one of the front brakes 41.

The opening degrees of the solenoid proportional control valves 612 and 613 are respectively adjusted by the solenoids 612A and 613A. After being depressurized and discharged, the hydraulic oil is partly directed back to the reservoir 515 of the above hydraulic supply system 51.

The shuttle valves 614 and 615 are disposed on the output sides of the solenoid proportional control valves 612 and 613, respectively. The shuttle valves 614 and 615 have, on one sides thereof, inputs being connected to outputs from the solenoid proportional control valve 612 and 613, and, on the other sides thereof, inputs being connected to each other via a pipe that communicates the inputs of the shuttle valves 614 and 615 to each other. In the middle of this pipe, an output pipe for the front brake valve 521 is connected.

The pressure sensors 616 and 617 are respectively disposed in the middles of pipes extending between the shuttle valves 614 and 615 and the solenoid proportional control valves 612 and 613. The pressure sensors 616 and 617 are configured to detect the brake pressure of the front brakes 41 and to output the detected signals to the TCS controller 7 as electric signals. The pressure sensors 616 and 617 may be disposed in the middles of pipes extending between the shuttle valves 614, 615, 624 and 625 and the slack adjusters 412 and 422.

The center hydraulic circuit 62 is a hydraulic circuit configured to perform the TCS control on the center brakes 42. The center hydraulic circuit 62 includes a center TCS switching valve 621, two solenoid proportional control valves 622 and 623, the two shuttle valves 624 and 625, and pressure sensors 626 and 627 in the same manner as the front hydraulic circuit 61.

Likewise, the solenoid proportional control valves 622 and 623 are respectively provided with solenoids 622A and 623A. The opening degree of each of the solenoid proportional control valves 622 and 623 is adjusted in accordance with an electric signal output from the TCS controller 7.

The center TCS switching valve 621 is also provided with a solenoid 621A. The center TCS switching valve 621 switches whether or not to perform TCS on the center brakes 42 in accordance with an electric signal output from the TCS controller 7.

The TCS control hydraulic circuit 6 enables a TCS function through the shifting of the positions of the valves of the above front hydraulic circuit 61 and center hydraulic circuit 62.

When the spool of the front TCS switching valve 611 is set at an upper position and the spool of the center TCS switching valve 621 is set at an upper position in FIG. 2, the TCS function is disabled.

In contrast, when the spool of the front TCS switching valve 611 is set at a lower position and the spool of the center TCS switching valve 621 is set at a lower position in FIG. 2, the TCS function is enabled.

In this case, in the front hydraulic circuit 61, the pressure oil discharged from the front TCS switching valve 611 is supplied to the solenoid proportional control valves 612 and 613. The opening degrees of the solenoid proportional control valves 612 and 613 are adjusted in accordance with an electric signal from the TCS controller 7. The pressure oil discharged from the solenoid proportional control valves 612 and 613 is supplied to the front brakes 41 via the shuttle valves 614 and 615.

In the center hydraulic circuit 62, the pressure oil discharged from the center TCS switching valve 621 is supplied to the solenoid proportional control valves 622 and 623. The pressure oil discharged from the solenoid proportional control valves 622 and 623 is supplied to the center brakes 42 via the shuttle valves 624 and 625.

At this time, the TCS controller 7 monitors the rotation speeds of the wheels 4 detected by the rotation speed sensors 43FL, 43FR, 43CL and 43CR, and outputs electric signals to the solenoids 612A, 613A, 622A and 623A in accordance with the slip ratios of the wheels 4 (which will be described later in detail). As a result, the opening degrees of the solenoid proportional control valves 612, 613, 622 and 623 are adjusted, thereby adjusting the braking forces of the front brakes 41 and center brakes 42. In this manner, while adjusting the driving force of each of the wheels 4 at an optimum value, the TCS controller 7 performs control for ensuring course-traceability when the vehicle is turned.

When the brake pedal 523 is operated, on the front side, the pressure oil discharged from the front brake valve 521 is supplied to the front brakes 41 via the shuttle valves 614 and 615, so that each of the front brakes 41 functions as a normal brake that increases the braking force thereof in accordance with the pressed amount of the brake pedal 523. On the rear side, the pressure oil discharged from the center brake valve 522 is supplied to the center brakes 42 via the shuttle valves 624 and 625, and each of the center brakes 42 likewise functions as a normal brake.

The solenoid proportional control valves 612, 613, 622 and 623 are also used as control valves for retarder control. The opening degree of each of the solenoid proportional control valves 612, 613, 622 and 623 is adjusted in accordance with a retarder command signal from the TCS controller 7.

4. Structure of TCS Controller 7

Figure 3:
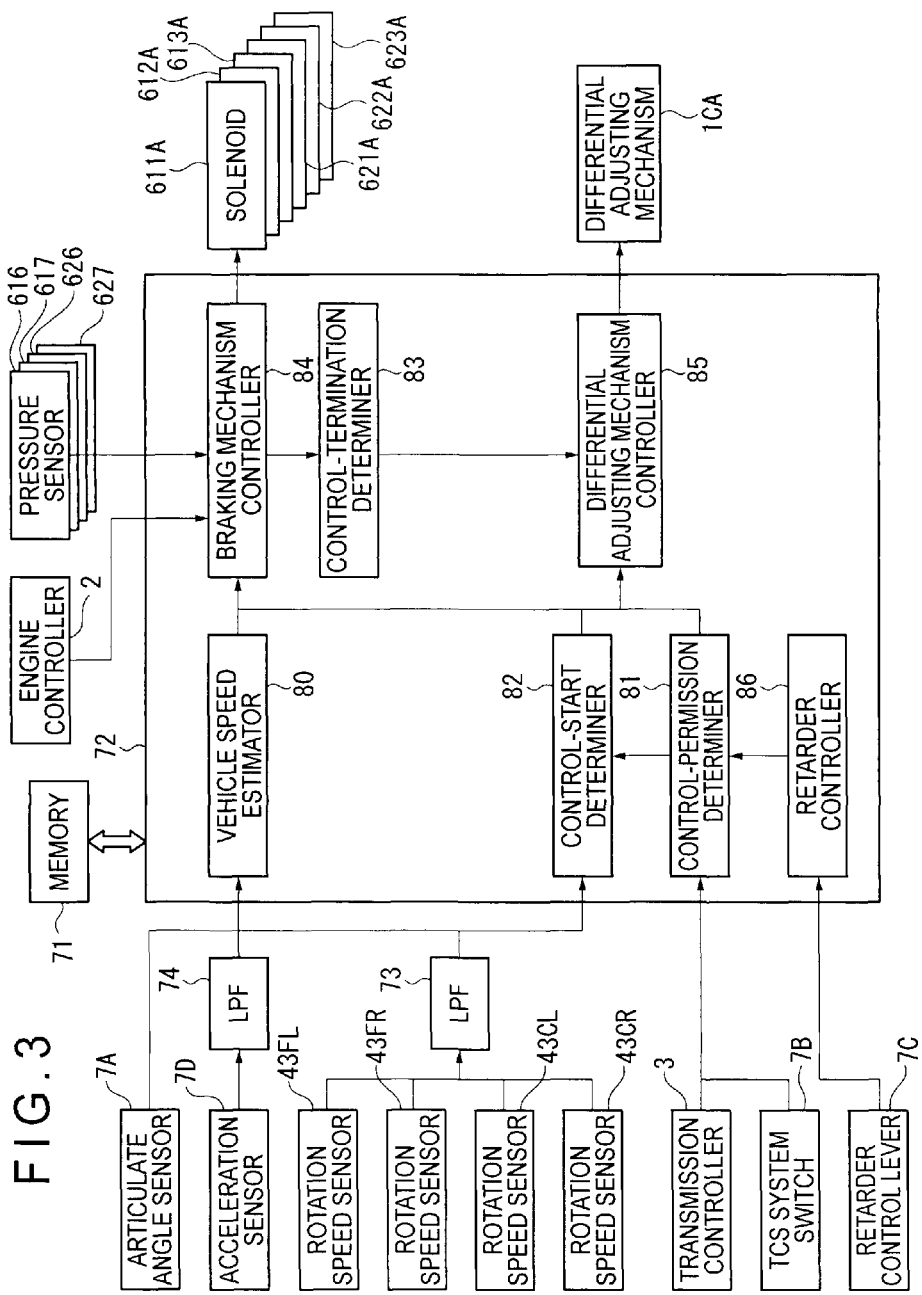
FIG. 3 is a functional block diagram of a TCS controller according to the exemplary embodiment.

FIG. 3 shows the structure of the TCS controller 7 that performs the above TCS control.

The TCS controller 7 includes a memory 71 as a storage and a processor 72.

The memory 71 stores not only a program executable on the processor 72 but also a map for TCS sliding mode control and the like, which are readable upon a request from the processor 72.

The rotation speed sensors 43FL, 43FR, 43CL and 43CR, the articulate angle sensor 7A, the TCS system switch 7B, the retarder control lever 7C and the pressure sensors 616, 617, 626 and 627 are connected to the input side of the processor 72.

The rotation speed sensors 43FL, 43FR, 43CL and 43CR and the acceleration sensor 7D are connected to the processor 72 via LPFs (Low Pass Filter) 73 and 74, so that rotation speed signals output from the rotation speed sensors 43FL, 43FR, 43CL and 43CR, and an acceleration signal output from the acceleration sensor 7D, from which a high-frequency component such as disturbance has been eliminated, are input to the processor 72 as rotation speeds ωfl, ωfr, ωcl and ωcr and as an acceleration acting in a travel direction of the dump truck 1.

In contrast, the solenoids 611A and 621A of the TCS switching valves 611 and 621 and the solenoids 612A, 613A, 622A and 623A of the solenoid proportional control valves 612, 613, 622 and 623 of the TCS control hydraulic circuit 6 are electrically connected to the output side of the processor 72.

The processor 72 is also electrically connected to the engine controller 2 and the transmission controller 3 so that information is exchangeable therebetween. Thus, the processor 72 can acquire various kinds of information required for the TCS control and the inter-axle differential control from the engine controller 2 and the transmission controller 3, such as an output torque value of the engine from the engine controller 2, and speed stage information and lock-up information from the transmission controller 3.

The processor 72 includes a vehicle speed estimator 80, a control-permission determiner 81, a control-start determiner 82, a control-termination determiner 83, a braking mechanism controller 84, a differential adjusting mechanism controller 85 and a retarder controller 86.

The braking mechanism controller 84 and the differential adjusting mechanism controller 85 are components of a driving-force controller according to the invention.

The control-permission determiner 81 determines whether or not to permit the TCS control. Specifically, the control-permission determiner 81 determines whether or not to permit the TCS control based on an operation condition of the TCS system switch 7B, an operation condition of the brake pedal 523, the speed stage information of the transmission 1B, a control condition of the retarder control, and an operation condition of an accelerator pedal (not shown).

The control-start determiner 82 is a section for determining whether or not start conditions for the TCS brake control have been fulfilled. The determination of starting conditions is based on the rotation speed signal of each of the wheels 4 detected by the rotation speed sensors 43FL, 43FR, 43CL and 43CR. Specifically, the control-start determiner 82 determines to start at least one of the TCS control and the inter-axle differential control when a rotation speed difference of the right and left wheels and a rotation speed difference of the front and rear wheels reach or exceed a predetermined threshold stored in the memory 71.

The control-termination determiner 83 is a section for determining whether or not to terminate the TCS control and the inter-axle differential control. In this exemplary embodiment, the control-termination determiner 83 determines whether or not to terminate the brake control on the front wheels 4, the brake control on the center wheels 4, and the inter-axle differential control with reference to a control deviation of each of the wheels 4 obtained by the braking mechanism controller 84.

The braking mechanism controller 84 generates and outputs a control command for the TCS. For generating the control command, an actual slip ratio λ, of each of the wheels 4 is calculated by the following equation (1) based on a vehicle speed V of the dump truck 1 estimated by the later-described vehicle speed estimator 80, a radius r of the wheels 4, and the rotation speeds ωfl, ωfr, ωcl and ωcr of the respective wheels 4.

$$\lambda = (r\omega - V)/r\omega \tag{1}$$

Next, the braking mechanism controller 84 calculates the target slip ratio η for each of the wheels 4 by applying the reference target slip ratio ηs stored in the memory 71 and the modifying target slip ratio ηa set in accordance with the articulate angle detected by the articulate angle sensor 7A in the following equation (2).

$$\eta = \eta s + \eta a \tag{2}$$

The braking mechanism controller 84 calculates the control deviation S by applying the calculated actual slip ratio λ and the target slip ratio η in the following equation (3).

$$S = \lambda - \eta \tag{3}$$

Next, the braking mechanism controller 84 estimates a force transmitted from the wheels 4 to the road surface (i.e., traction force) based on the output torque of the engine sent from the engine controller 2, speed stage information sent from the transmission controller 3, and the specification data of the dump truck 1 having been stored in the memory 71.

The braking mechanism controller 84 applies a control law of sliding mode control to the vehicle model of the dump truck 1 based on the calculated control deviations S and the estimated traction force to generate and output a control command to solenoids 611A, 612A, 613A, 621A, 622A and 623A of the TCS control hydraulic circuit 6, thereby controlling the braking forces of the wheels 4.

The differential adjusting mechanism controller 85 generates a control command for controlling the differential restraining force of the differential mechanism 1C and outputs the generated control command to the differential adjusting mechanism 1CA. Specifically, when the inter-axle differential control is determined to be performed by the control-start determiner 82, the differential adjusting mechanism controller 85 generates a control command for restraining the differential of the differential mechanism 1C and outputs the control command to the differential adjusting mechanism 1CA.

The retarder controller 86 enables a constant-speed travel control of the dump truck 1 based on information such as a payload of the dump truck 1 and slope conditions detected by the acceleration sensor 7D. When the retarder control lever 7C is ON, the retarder controller 86 generates and outputs a control command to the solenoids 611A, 612A, 613A, 621A, 622A and 623A and controls the braking of the front brakes 41 and the center brakes 42, thereby performing a constant-speed travel control.

5. Structure of Vehicle Speed Estimator 80

Figure 4:
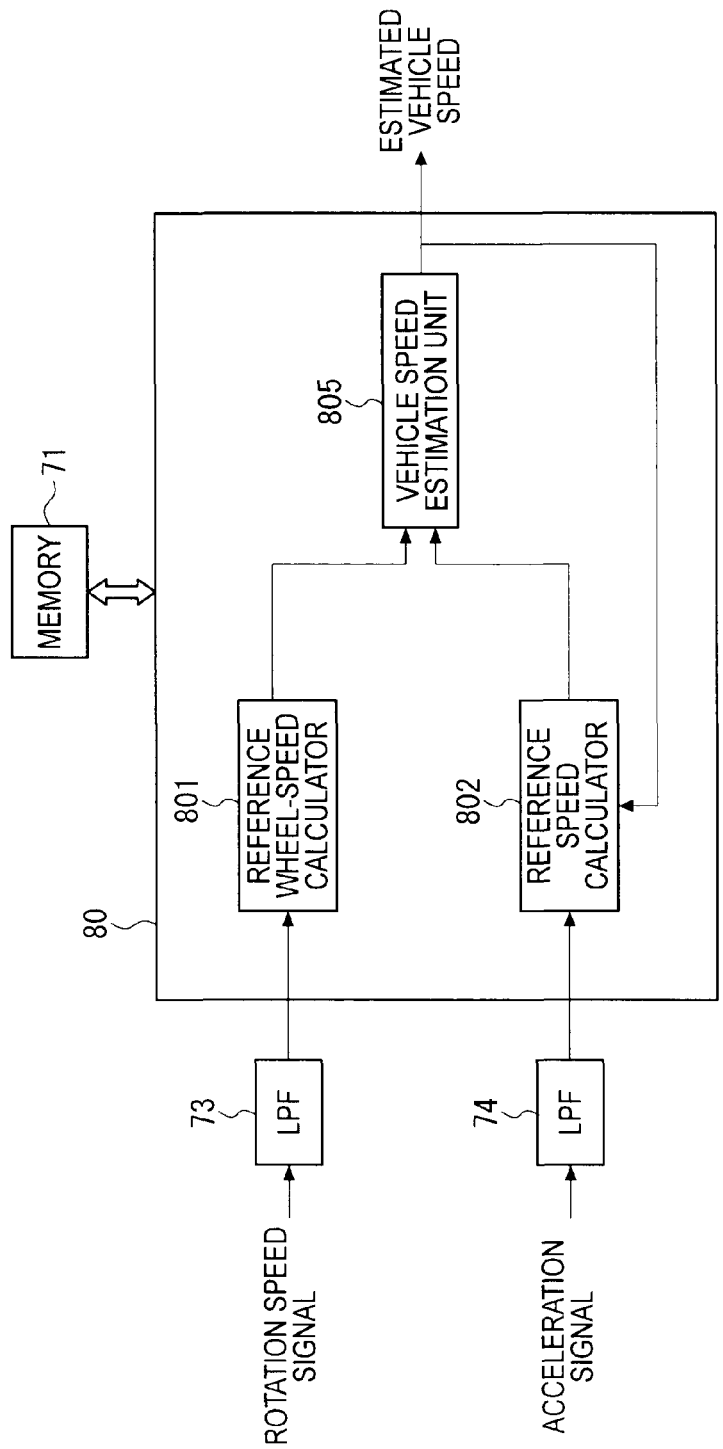
FIG. 4 is a functional block diagram of a vehicle speed estimator according to the exemplary embodiment.

FIG. 4 shows a detailed structure of the vehicle speed estimator 80. The vehicle speed estimator 80 includes a reference wheel-speed calculator 801, a reference speed calculator 802, and a vehicle speed estimation unit 805.

The reference wheel-speed calculator 801 selects a minimum rotation speed ($\omega$min) among the rotation speeds ($\omega$fl, $\omega$fr, $\omega$cl and $\omega$cr) of the wheels 4 respectively detected by the rotation speed sensors 43FL, 43FR, 43CL and 43CR, removes high frequency components from a signal of the selected rotation speed $\omega$min by LPF73, and then calculates a reference wheel-speed Vre1 by the following equation (4) with the radius r of the wheels 4.

$$Vre1 = r \times \omega min \quad (4)$$

The rotation speed $\omega$ among those of the wheels 4 having the minimum rotation speed $\omega$ is selected because the wheel 4 having the minimum rotation speed $\omega$ is skidding the least among all the wheels 4 of the dump truck 1.

The reference speed calculator 802 calculates a reference speed Vre2 from an acceleration filter value input through LPF74. Specifically, the reference speed calculator 802 calculates the acceleration filter value input during travel of the dump truck 1 as an acceleration and deceleration component, add a value of integral of the acceleration and deceleration component to the previously estimated vehicle speed V in accordance with the travel condition of the dump truck 1, and sets the reference speed Vre2 which is a candidate of another estimated vehicle speed V. Under the conditions that the acceleration and deceleration component is less than zero and the transmission 1B is released from a lockup, the reference speed calculator 802 does not execute the integration processing and sets the previously estimated vehicle speed V as the reference speed Vre2 so as to avoid further speed-reduction in accordance with increasing brake commands from the TCS control (which will be described later in detail).

The vehicle speed estimation unit 805 estimates the vehicle speed V to be finally used in the equitation (1) in the TCS control of the braking mechanism controller 84 based on the reference wheel speed Vre1 calculated by the reference wheel-speed calculator 801 and the reference speed Vre2 calculated by the reference speed calculator 802.

Figure 5:
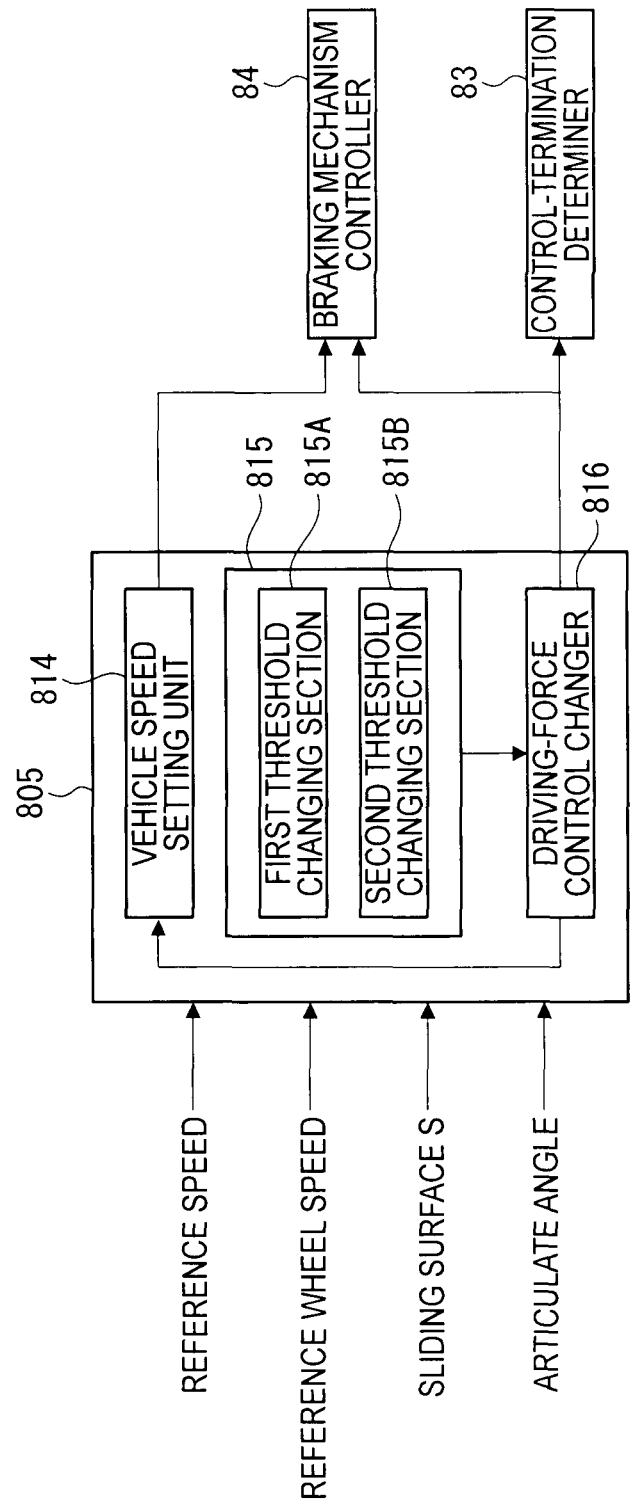
FIG. 5 is a functional block diagram of a vehicle speed estimation unit according to the exemplary embodiment.

As shown in FIG. 5, the vehicle speed estimation unit 805 includes a vehicle speed setting unit 814, a vehicle state determiner 815 and a driving-force control changer 816.

The vehicle speed setting unit 814 finally sets the vehicle speed V based on the reference speed Vre2 and the reference wheel speed Vre1 to be input.

The vehicle speed setting unit 814 determining whether the reference speed Vre2 calculated by the reference speed calculator 802 is excessively high or low. When determining the reference speed Vre2 is erroneously calculated, the vehicle speed setting unit 814 estimates the vehicle speed V as the reference wheel speed Vre1. The vehicle speed V is estimated in accordance with the travel conditions of the dump truck 1 (which will be described later in detail), as shown in the following Table 1.

TABLE 1

| JUDGING CONDITIONS | PROCESSING CONTENTS |
| --- | --- |
| accelerator off or Vre1 < 0.3 m/s | V = Vre1 |
| Vre2 < Vre1 × 0.5 | V = Vre1 × 0.5 |
| Vre2 > Vre1 | V = Vre1 |
| less than 0.1 of control deviations of all wheels and less than −0.1 m/s$^2$ of acceleration and deceleration component | The previous estimated wheel speed is maintained. |

The vehicle state determiner 815 determines whether the previously estimated vehicle speed V calculated by the vehicle speed setting unit 814 and the braking control by the braking mechanism controller 84 are balanced, and includes a first threshold changing section 815A and a second threshold changing section 815B.

The vehicle state determiner 815 determines whether or not the vehicle speed V estimated by the vehicle speed setting unit 814 and the braking control by the braking mechanism controller 84 are balanced, based on the determinations of whether or not the control deviations S calculated by the above equations (1) to (3) fall within a predetermined range and whether or not the braking control amount output from the braking mechanism controller 84 is a predetermined threshold or more (which will be described later in detail).

When the vehicle state determiner 815 determines a threshold for balance, the first threshold changing section 815A changes a threshold of the control deviations S, a threshold of the braking control amount and an elapsed time setting for determination, depending on whether or not the articulate angle output from the articulate angle sensor 7A exceeds, for instance, 20 degrees.

When the vehicle state determiner 815 determines a threshold for balance, the second threshold changing section 815B changes the range of the control deviations S, the threshold of the braking control amount and the elapsed time setting for determination, depending on whether or not a change amount per unit time of an articulate angle signal output from the articulate angle sensor 7A exceeds, for instance, 10 degrees per second.

The driving-force control changer 816 changes the braking control performed by the braking mechanism controller 84 when the vehicle state determiner 815 determines that the estimated vehicle speed V and the braking control amount are not balanced and kept in an inappropriate state. Specifically, when the estimated vehicle speed V and the braking control amount are unbalanced, the driving-force control changer 816 outputs a release signal for releasing TCS control by a TCS controller 7 to the control-termination determiner 83. The driving-force control changer 816 also outputs a signal of V=Vre1 to the braking mechanism controller 84 or the vehicle speed setting unit 814.

6. Operation and Effects of Vehicle Speed Estimator 80

Next, an operation of the above-described vehicle speed estimator 80 will be described with reference to FIGS. 6 to 16.

Figure 6:
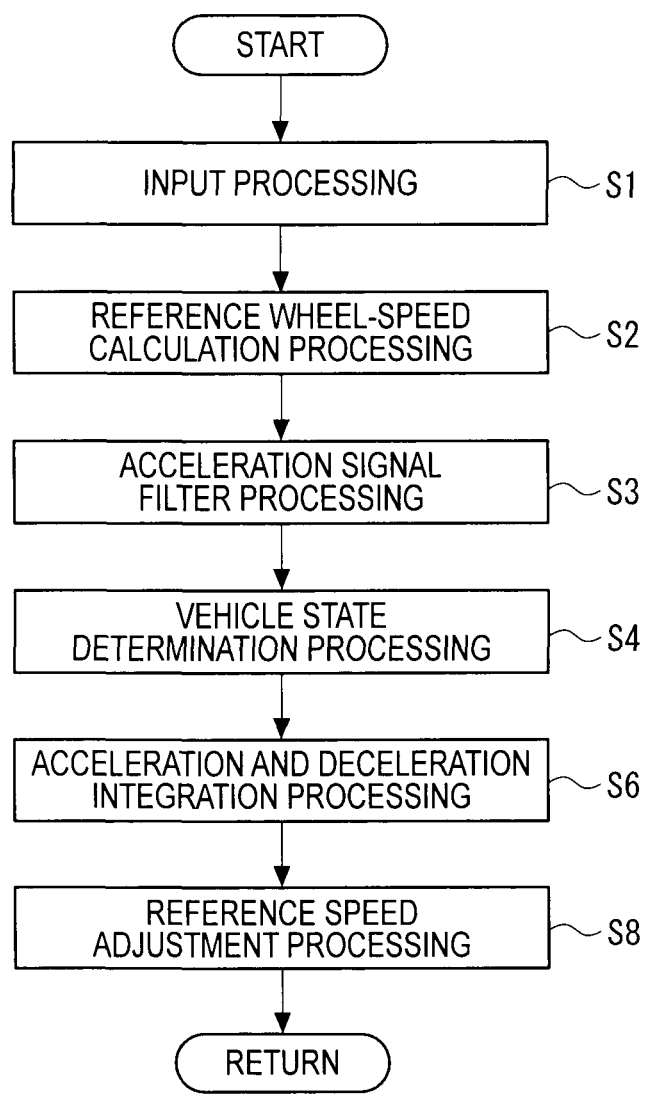
FIG. 6 is a flowchart for illustrating an operation in the exemplary embodiment.

As shown in FIG. 6, the vehicle speed estimator 80 performs an input processing S1 for inputting various data, a reference wheel-speed calculation processing S2, an acceleration signal filter processing S3, a vehicle state determination processing S4, an acceleration and deceleration integration processing S6 and a reference speed adjustment processing S8, thereby estimating the vehicle speed of the dump truck 1. The processings S1 to S8 will be respectively described in detail. The processings S1 to S8 are repeated in a predetermined cycle.

(6-1) Input Processing S1

In order to operate the vehicle speed estimator 80 to estimate a vehicle speed, various state data of the dump truck 1 are input to the vehicle speed estimator 80. Specifically, the rotation speeds from the rotation speed sensors 43FL, 43FR, 43CL and 43CR, flag information showing whether or not the TCS control is under operation, flag information showing whether or not a lockup is switched, flag information showing whether an acceleration operation is ON or OFF, and flag information showing whether or not rotation deviation of the right and left wheels occurs are input to the vehicle speed estimator 80.

(6-2) Reference Wheel-Speed Calculation Processing S2

The reference wheel-speed calculation processing S2 is performed by the reference wheel-speed calculator 801. Specifically, the reference wheel-speed calculator 801 initially selects a maximum rotation speed ωmax and the minimum rotation speed ωmin from the rotation speeds ωfl, ωfr, ωcl and ωcr of the wheels 4 respectively input from the rotation sensors 43FL, 43FR, 43CL and 43CR, and calculates the maximum reference wheel speed and the minimum reference wheel speed by the equation (4).

Next, the reference wheel-speed calculator 801 calculates variation in the reference wheel speeds of the wheels 4 by a difference between the maximum reference wheel speed and the minimum reference wheel speed.

Finally, the reference wheel-speed calculator 801 selects the minimum reference wheel speed as the reference wheel speed Vre1.

(6-3) Acceleration Signal Filter Processing S3

In the acceleration signal filter processing S3, the acceleration signal output from the acceleration sensor 7D is filtered by LPF74 to remove noises, vehicle vibration components and the like and the thus obtained acceleration filter value by the filter processing is output to the vehicle speed estimator 80.

(6-4) Vehicle State Determination Processing S4

Figure 7:
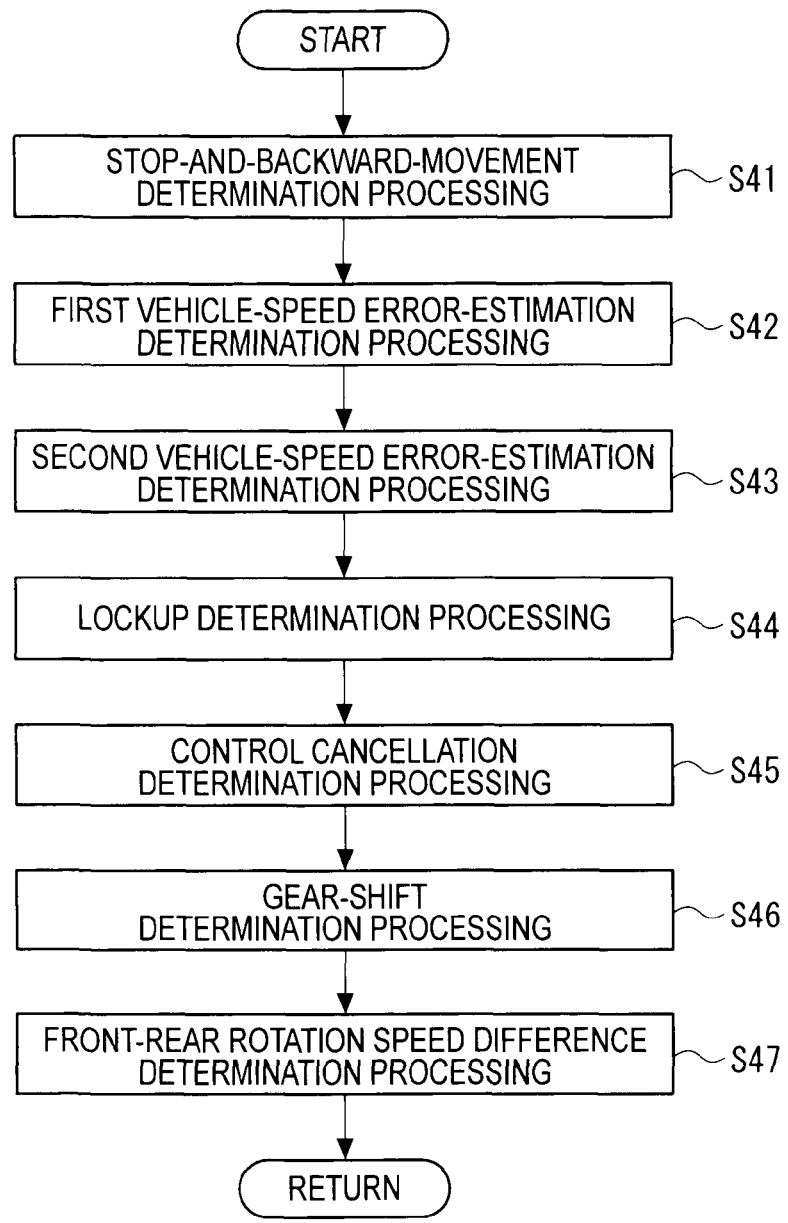
FIG. 7 is a flowchart for illustrating an operation of a vehicle state determination processing in the exemplary embodiment.

The vehicle state determination processing S4 is performed by the vehicle state determiner 815 of the vehicle speed estimator 805. As shown in FIG. 7, the vehicle state determination processing S4 includes a stop-and-backward-movement determination processing S41 of the dump truck 1, a first vehicle-speed error-estimation determination processing S42, a second vehicle-speed error-estimation determination processing S43, a lockup determination processing S44, a control cancellation determination processing S45, a gear-shift determination processing S46 and a front-rear rotation speed difference determination processing S47.

In the stop-and-backward-movement determination processing S41, when the maximum reference wheel speed is 0 or less and the acceleration operation is OFF, it is determined that the dump truck 1 is stopped. Since a forward direction of the dump truck 1 is set as positive in the vehicle speed estimation in this exemplary embodiment, when a gear-shift of the dump truck 1 is set at R1 or R2, the dump truck 1 is determined as going backward and the acceleration filter value is reversed to negative.

Figure 8:
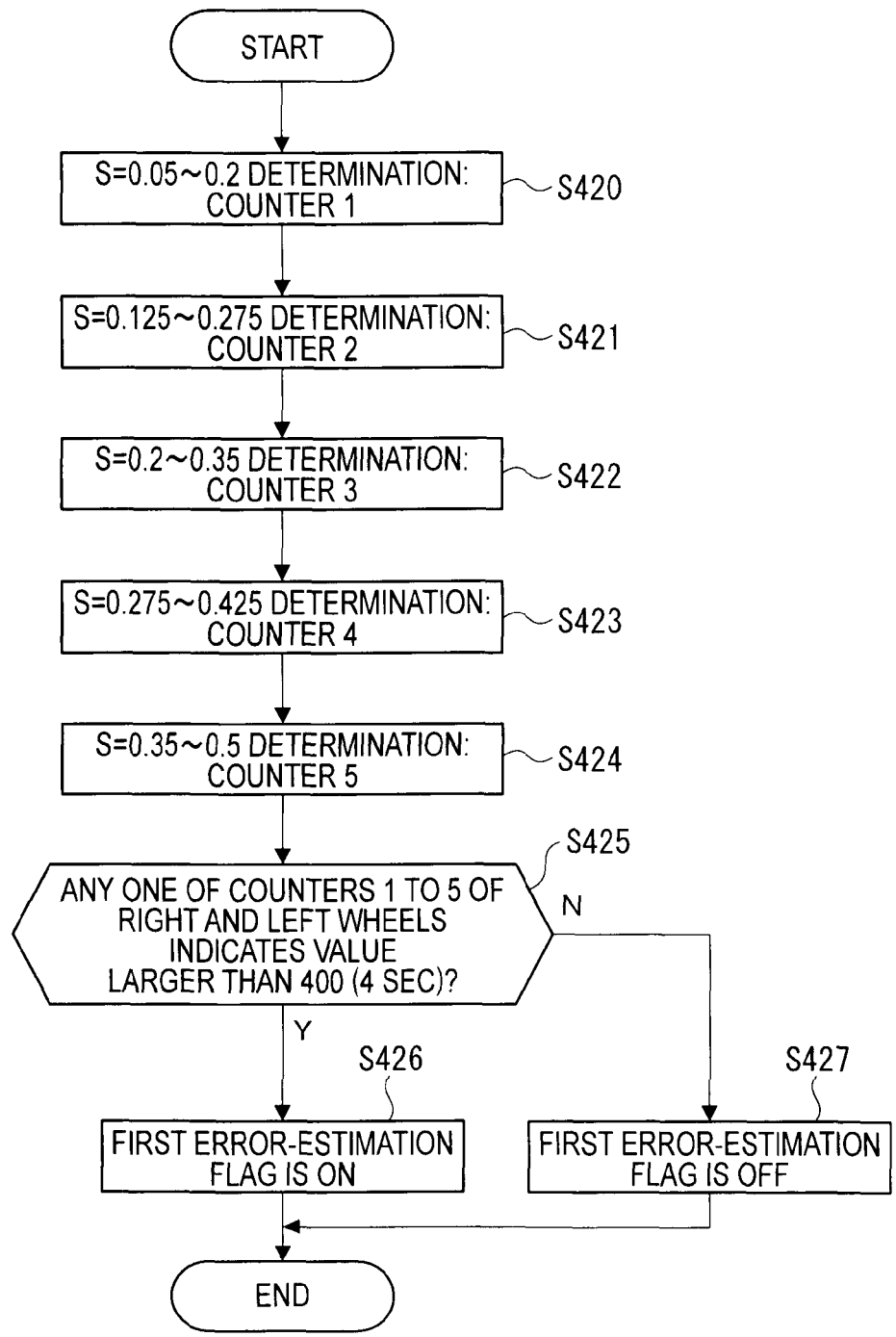
FIG. 8 is a flowchart for illustrating an operation of a vehicle state determination processing in the exemplary embodiment.

As shown in the flowchart of FIG. 8, in Steps S420 to S424 of the first vehicle-speed error-estimation determination processing S42, values of counters 1 to 5 are incremented or cleared in accordance with the values of the control deviations S calculated by the braking mechanism controller 84, thereby determining whether or not the values of the control deviations S elapsed in a predetermined range for a predetermined time.

Figure 9:
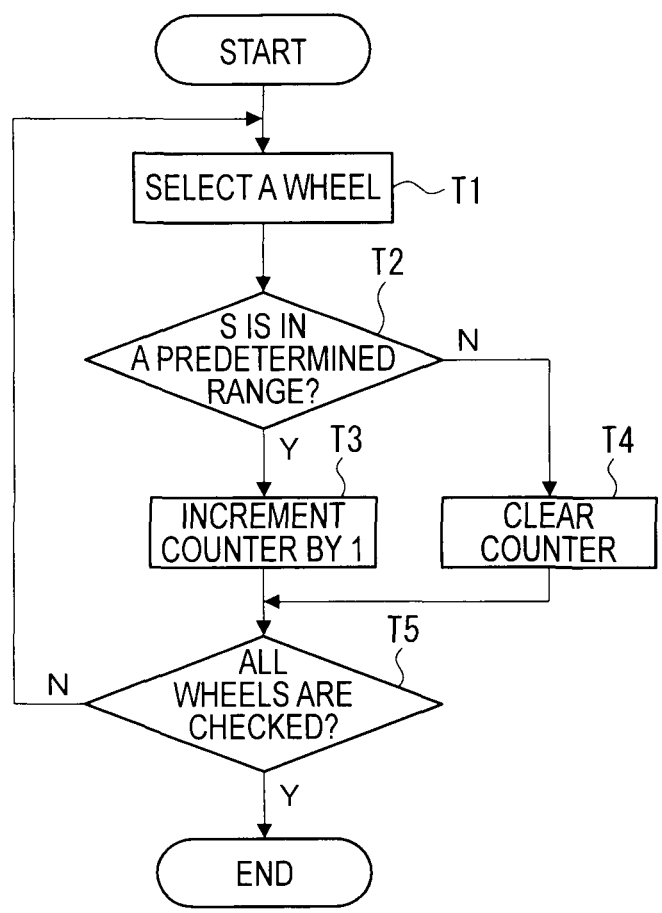
FIG. 9 is a flowchart for illustrating an operation of a vehicle state determination processing in the exemplary embodiment.

Specifically, in Step S420, it is determined whether or not the control deviation S of each of the wheels 4 is in a range of 0.05 to 0.2. As shown in the flowchart of FIG. 9, any one of the wheels 4 (front-right, front-left, rear-right, rear-left) is selected (Step T1) and it is determined whether or not a value of a control deviation S of the selected wheel 4 is in the range of the control deviation S set in each of the Steps S420 to S424 (Step T2).

For instance, when the value of the control deviation S of the front-left wheel 4 is in a range of S=0.05 to 0.2, the counter 1 is incremented (Step T3). When not in the range, the counter 1 is cleared (Step T4). These steps are repeated until the determination of the value of the control deviation S for each of all the wheels 4 is terminated (Step T5).

Subsequently, similarly, in Step S421, when the value of the control deviation S for each of the wheels 4 is in a range of 0.125 to 0.275, the counter 2 is incremented. When not in the range, the counter 2 is cleared.

In Step S422, the counter 3 is incremented or cleared depending on whether or not the value of the control deviation S for each of the wheels 4 is in a range of 0.2 to 0.35. In Step S423, the counter 4 is incremented or cleared depending on whether or not the value of the control deviation S for each of the wheels 4 is in a range of 0.275 to 0.425. In Step S424, the counter 5 is incremented or cleared depending on whether or not the value of the control deviation S for each of the wheels 4 is in a range of 0.35 to 0.5.

After completing the above determination processing of the control deviations S, the vehicle state determiner 815 determines whether or not any one of the values of the counters 1 to 5 of each of the wheels 4 is larger than, for instance, 400 (4 seconds) (Step S425). When the value is larger, it is determined that the slip ratio is larger than the original target value and is kept for a predetermined time (4 seconds) or more and the vehicle speed V set by the vehicle speed setting unit 814 is different from the actual vehicle speed, whereby a first error-estimation flag is set to be ON (Step S426). Thus, the processing is terminated.

On the other hand, when it is determined that all of the values of the counters 1 to 5 of each of the wheels 4 are 400 or less, the vehicle state determiner 815 determines that the vehicle speed V set by the vehicle speed setting unit 814 is correct, whereby the first error-estimation flag is set to be OFF (Step S427). Thus, the processing is terminated.

Referring to FIG. 7, after completing the first vehicle-speed error-estimation determination processing in Step S42, the vehicle state determiner 815 performs the second vehicle-speed error-estimation determination processing.

Figure 10:
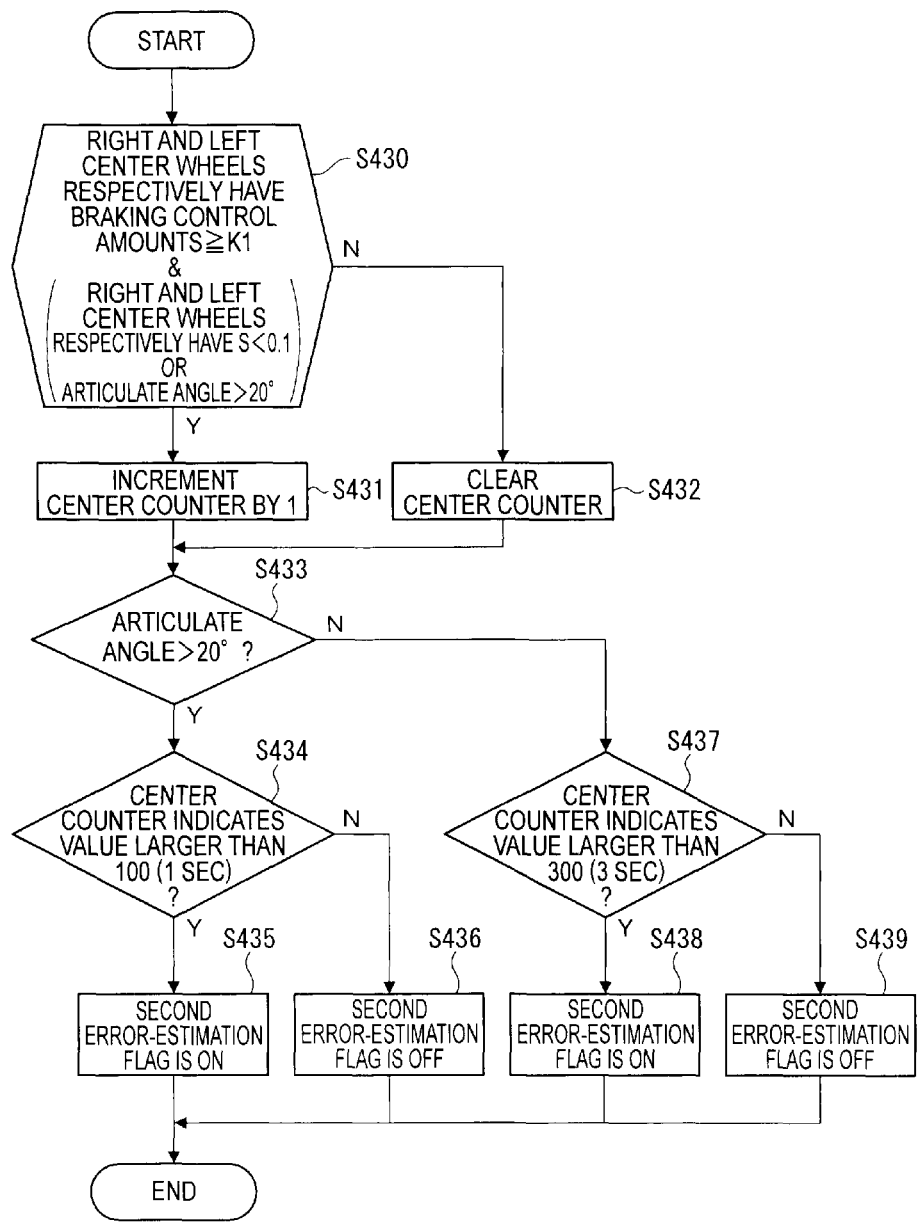
FIG. 10 is a flowchart for illustrating an operation of a vehicle state determination processing in the exemplary embodiment.

In the second vehicle-speed error-estimation determination processing S43, the processings shown in the flowchart of FIG. 10 are performed to determine whether or not the vehicle speed V set by the vehicle speed setting unit 814 is erroneous, because the vehicle speed V is highly possibly erroneous under the conditions of a small control deviation, a large braking control amount, and a predetermined elapsed time.

First, the vehicle state determiner 815 determines whether or not both of the braking control amounts of the right and left center wheels 4 are a predetermined threshold K1 or more and the values of the control deviations S of the right and left center wheels 4 are less than 0.1, or whether or not the articulate angle detected by the articulate angle sensor 7A exceeds 20 degrees (Step S430).

When the above conditions are satisfied, the vehicle state determiner 815 increments the center counter (Step S431). When the above conditions are not satisfied, the vehicle state determiner 815 clears the center counter (Step S432).

Subsequently, the vehicle state determiner 815 determines whether or not the articulate angle exceeds 20 degrees (Step S433).

When determining the articulate angle exceeds 20 degrees, the vehicle state determiner 815 determines whether or not the center counter exceeds 100 (1 second) (Step 434). When the center counter exceeds 100 (1 second), since the vehicle is rotating with a large articulate angle and a difference between an inner wheel and an outer wheel occurs due to rotation, the vehicle speed V is possibly erroneously estimated. Accordingly, the vehicle state determiner 815 sets the first error-estimation flag to be ON (Step S435). When the center counter does not exceed 100 (1 second), the vehicle state determiner 815 sets the second error-estimation flag to be OFF (Step S436). Thus, the processing is terminated.

When determining the articulate angle is 20 degrees or less, the vehicle state determiner 815 determines whether or not the center counter exceeds, for instance, 300 (3 second) (Step 437). When the center counter exceeds 300 (3 second), the vehicle state determiner 815 sets the second error-estimation flag to be ON (Step S438). When the center counter does not exceed 300 (3 second), the vehicle state determiner 815 sets the second error-estimation flag to be OFF (Step S439). Thus, the processing is terminated.

Referring to FIG. 7, after completing the second vehicle-speed error-estimation determination processing S43, the vehicle state determiner 815 performs the lockup determination processing S44. The lockup determination processing S44 is a processing for determining a lockup state when a gear-shift command is given to shift to a position other than the neutral position. Switch flag information is determined to be ON for a predetermined time after a lockup release command is output and to be OFF after the predetermined time.

After the lockup determination processing S44, the vehicle state determiner 815 performs the control cancellation determination processing S45 for determining whether or not to cancel the TCS control.

Figure 11:
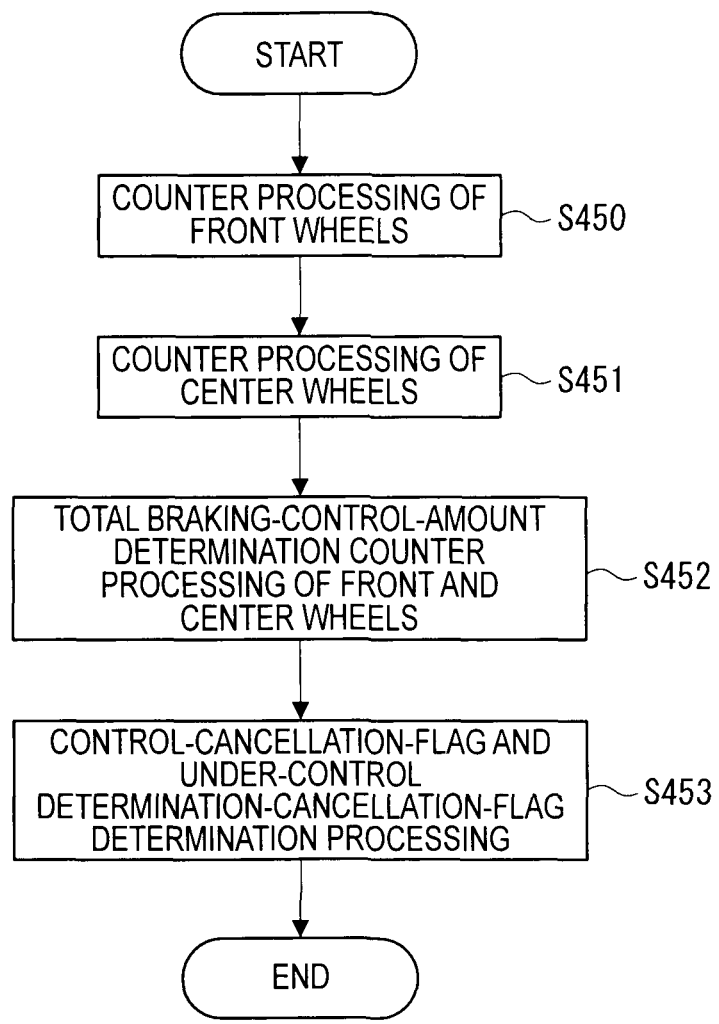
FIG. 11 is a flowchart for illustrating an operation of a vehicle state determination processing in the exemplary embodiment.

As shown in the flowchart in FIG. 11, in the control cancellation determination processing S45, a counter processing S450 of the front wheels 4, a counter processing S451 of the center wheels 4, a total braking-control-amount determination counter processing S452 of the front and center wheels, and a control-cancellation-flag and under-control determination-cancellation-flag determination processing S453 are sequentially executed.

Figure 12:
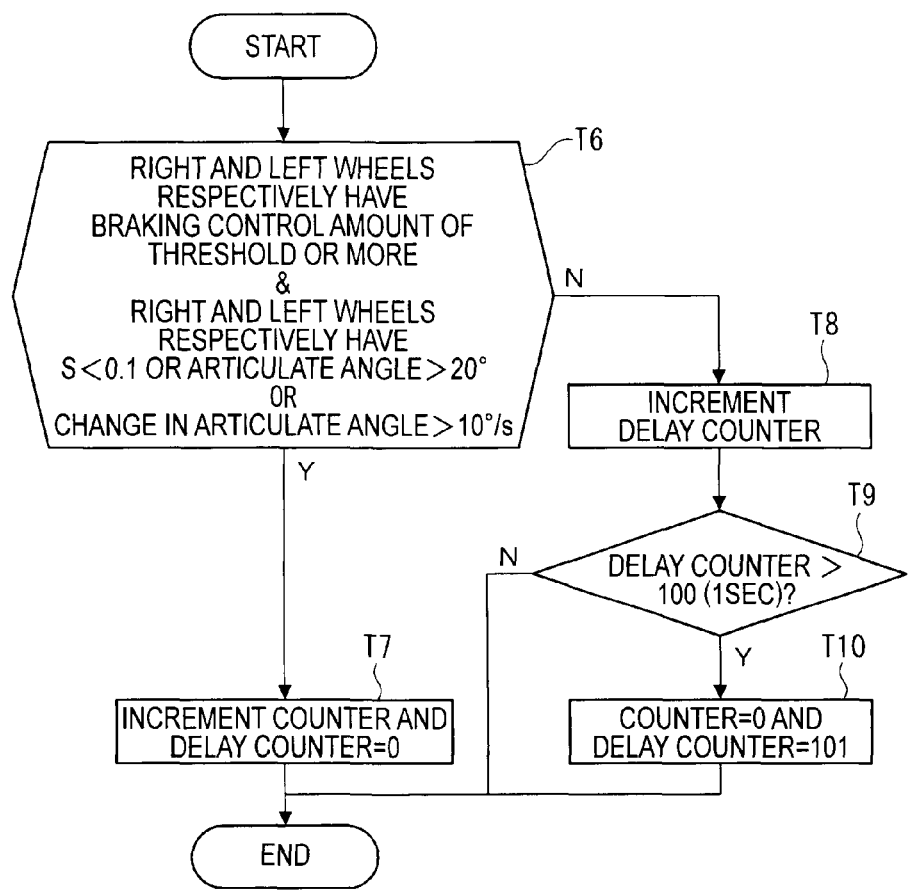
FIG. 12 is a flowchart for illustrating an operation of a vehicle state determination processing in the exemplary embodiment.

In the counter processing S450 of the front wheels 4, Steps T6 to T10 shown in the flowchart of FIG. 12 are executed.

First, the vehicle state determiner 815 determines whether or not the braking control amounts of the right and left front wheels 4 are a predetermined threshold or more and the values of the control deviations S of the right and left front wheels 4 are less than 0.1, whether or not the articulate angle exceeds 20 degrees, or whether or not the change in the articulate angle per unit time exceeds 10 degrees per second (Step T6).

When determining all the conditions are satisfied, the vehicle state determiner 815 increments the front counters and sets the value of the front delay counter at zero (Step T7).

When any one of the conditions is not satisfied, the vehicle state determiner 815 increments the front delay counters (Step T8), and determines whether or not the front delay counter exceeds 100 (1 second) (Step T9). When the front delay counter does not exceed 100, the processing is terminated.

When the front delay counter exceeds 100, the vehicle state determiner 815 sets the front counter at zero and sets the front delay counter at 101 (Step T10). Thus, the processing is terminated.

In the counter processing S451 of the center wheels 4, the value of the center counter and the value of the center delay counter are set in the same manner as the above. Thus, the processing is terminated.

Figure 13:
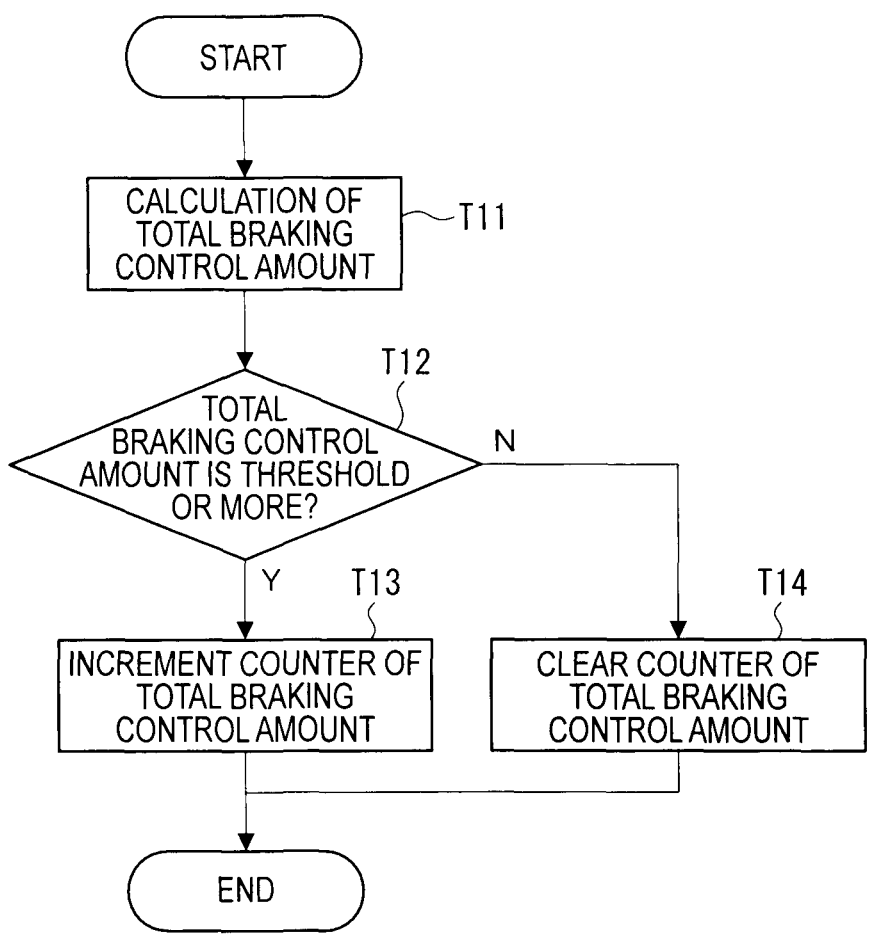
FIG. 13 is a flowchart for illustrating an operation of a vehicle state determination processing in the exemplary embodiment.
Figure 14:
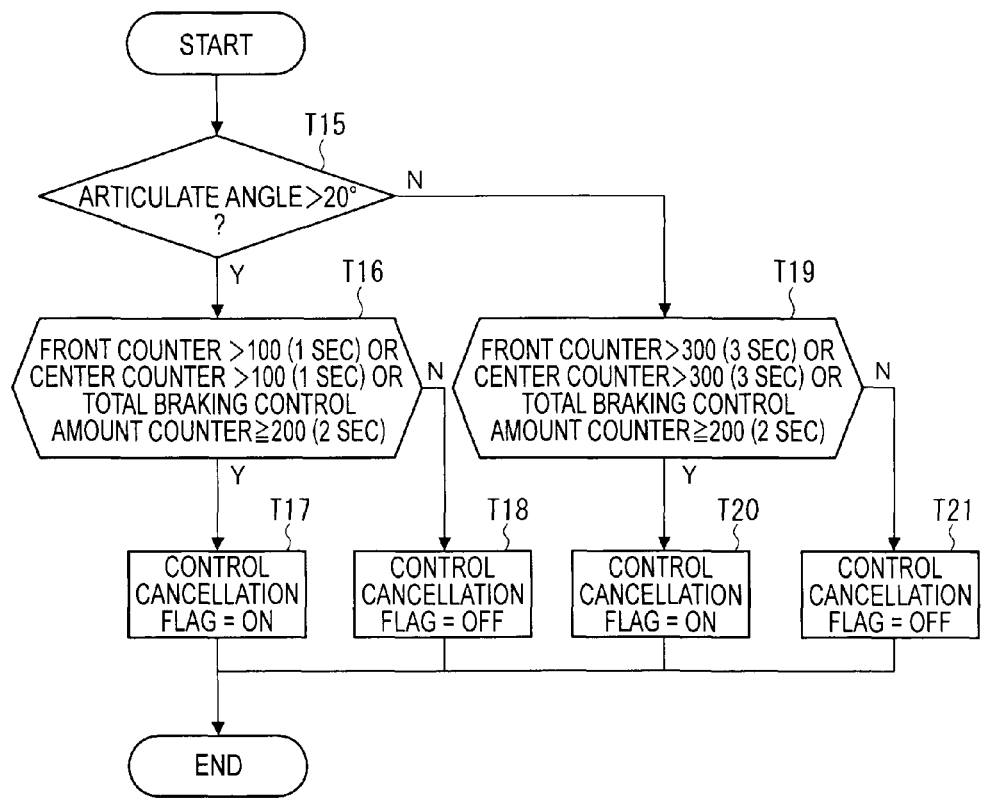
FIG. 14 is a flowchart for illustrating an operation of a vehicle state determination processing in the exemplary embodiment.

Next, the vehicle state determiner 815 executes the total braking-control-amount determination counter processing S452 of the front and center wheels, which is specifically the processing shown in the flowchart of FIG. 13.

The vehicle state determiner 815 acquires the braking control amount of each of the wheels 4 output from the braking mechanism controller 84 and calculates a total braking control amount (Step T11). The total braking control amount is calculated by adding a lager one of the braking control amounts of the right and left front wheels 4 and a lager one of the braking control amounts of the right and left center wheels 4.

The vehicle state determiner 815 determines whether or not the total braking control amount is a predetermined threshold or more (Step T12). When determining the total braking control amount is the predetermined threshold or more, the vehicle state determiner 815 increments a total braking-control-amount counter (Step T13). When determining the total braking control amount is not at the predetermined threshold or more, the vehicle state determiner 815 sets the total braking-control-amount counter at zero (Step T14) to complete the processing.

Finally, the vehicle state determiner 815 executes the control-cancellation-flag and under-control determination-cancellation-flag determination processing S453. Specifically, the vehicle state determiner 815 executes the processings of FIG. 14.

The vehicle state determiner 815 determines whether or not the articulate angle exceeds 20 degrees (Step T15). When the articulate angle exceeds 20 degrees, the vehicle state determiner 815 further determines whether or not the front counters or the center counters exceed 100 (1 second) or whether or not the total braking control amount counter exceeds 200 (2 seconds) (Step T16). When the front counters or the center counters exceed 100 (1 second) or the total braking control amount counter exceeds 200 (2 seconds), the estimation of the vehicle speed V is possibly erroneous during rotation. Accordingly, in order to avoid excessive braking, the control cancellation flag is set to be ON (Step T17). When the front counters or the center counters do not exceed 100 (1 second) or the total braking control amount counter does not exceed 200 (2 seconds), the control cancellation flag is set to be OFF (Step T18).

When the articulate angle is 20 degrees or less, the vehicle state determiner 815 further determines whether or not the front counters or the center counters exceed 300 (3 seconds) or whether or not the total braking control amount counter exceeds 200 (2 seconds) (Step T19). When the front counters or the center counters exceed 300 (3 seconds) or the total braking control amount counter exceeds 200 (2 seconds), the estimation of the vehicle speed V is possibly erroneous during rotation. Accordingly, in order to avoid excessive braking, the control cancellation flag is set to be ON (Step T20). When the front counters or the center counters do not exceed 300 (3 seconds) or the total braking control amount counter does not exceed 200 (2 seconds), the control cancellation flag is set to be OFF (Step T21).

Next, the vehicle state determiner 815 performs the gear-shift determination processing S46. The gear-shift determination processing S46 is a processing for determining whether or not the transmission 1B is shifting gears, i.e., the gear-shift determination processing S46 determines a gear-shift state of the transmission 1B based on a gear-shift signal of the transmission controller 3.

Finally, the vehicle state determiner 815 performs the front-rear rotation speed difference determination processing S47. The front-rear rotation speed difference determination processing S47 is a processing for determining whether or not a difference in rotation between a front output shaft and a rear output shaft of the transmission 1B is large. When the difference in rotation between the front output shaft and the rear output shaft is a predetermined threshold or more, it is determined that there is the deference therebetween.

As described above, the control-termination determiner 83 outputs a command of whether or not to cancel the TCS control to the braking mechanism controller 84 based on various flag information set in the vehicle state determination processing S4. The braking mechanism controller 84 performs or cancels the TCS control based on the command.

(6-5) Acceleration and Deceleration Component Integration Processing S6

Figure 15:
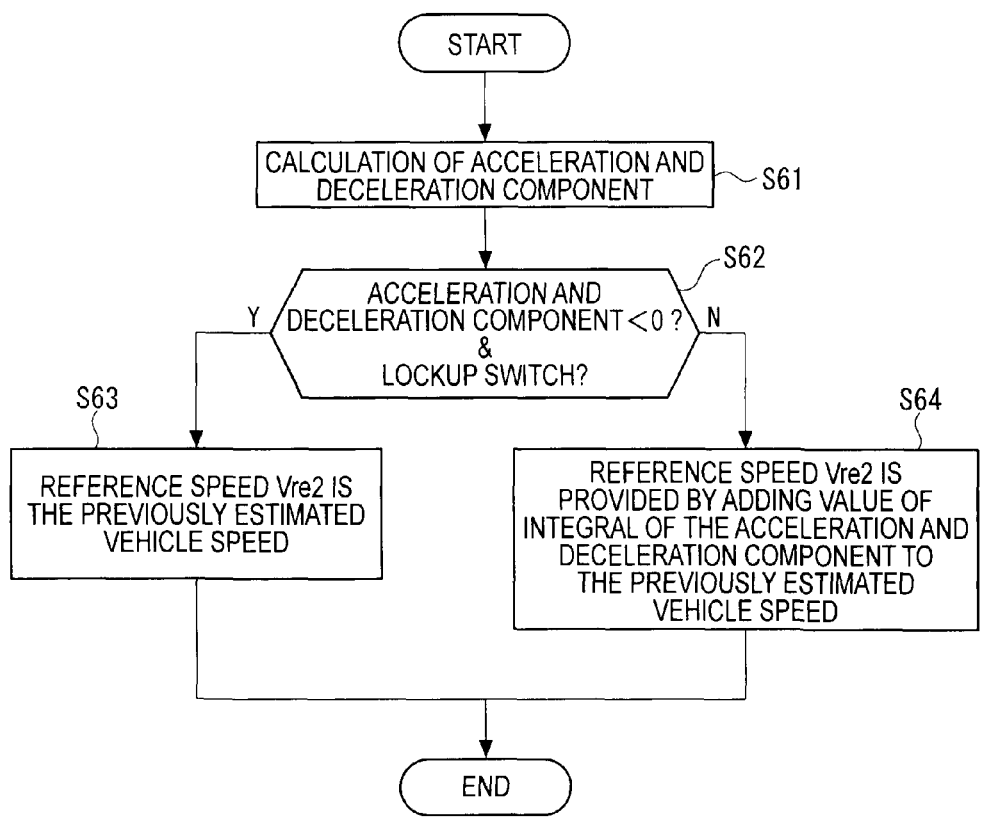
FIG. 15 is a flowchart for illustrating steps of an integration processing of an acceleration and deceleration component in the exemplary embodiment.

As shown in the flowchart of FIG. 15, first, the reference speed calculator 802 calculates the acceleration filter value as the acceleration and deceleration component (Step S61).

Next, the reference speed calculator 802 determines whether or not the calculated acceleration and deceleration component is less than zero and the lockup switch flag information is ON (Step S62).

When determining that the calculated acceleration and deceleration component is less than zero and the lockup switch flag information is ON (Step S62), the reference speed calculator 802 sets the previously estimated vehicle speed V as the reference speed Vre2 (Step S63).

On the other hand, when either of the conditions shown in Step S62 is not satisfied, the reference speed calculator 802 adds a value of integral of the acceleration and deceleration component to the previously estimated vehicle speed V (Step S64). The value of integral of the acceleration and deceleration component is calculated by multiplying the value of the acceleration and deceleration component that is calculated by a predetermined sampling cycle by a sampling time.

(6-6) Reference Speed Adjustment Processing S8

Figure 16:
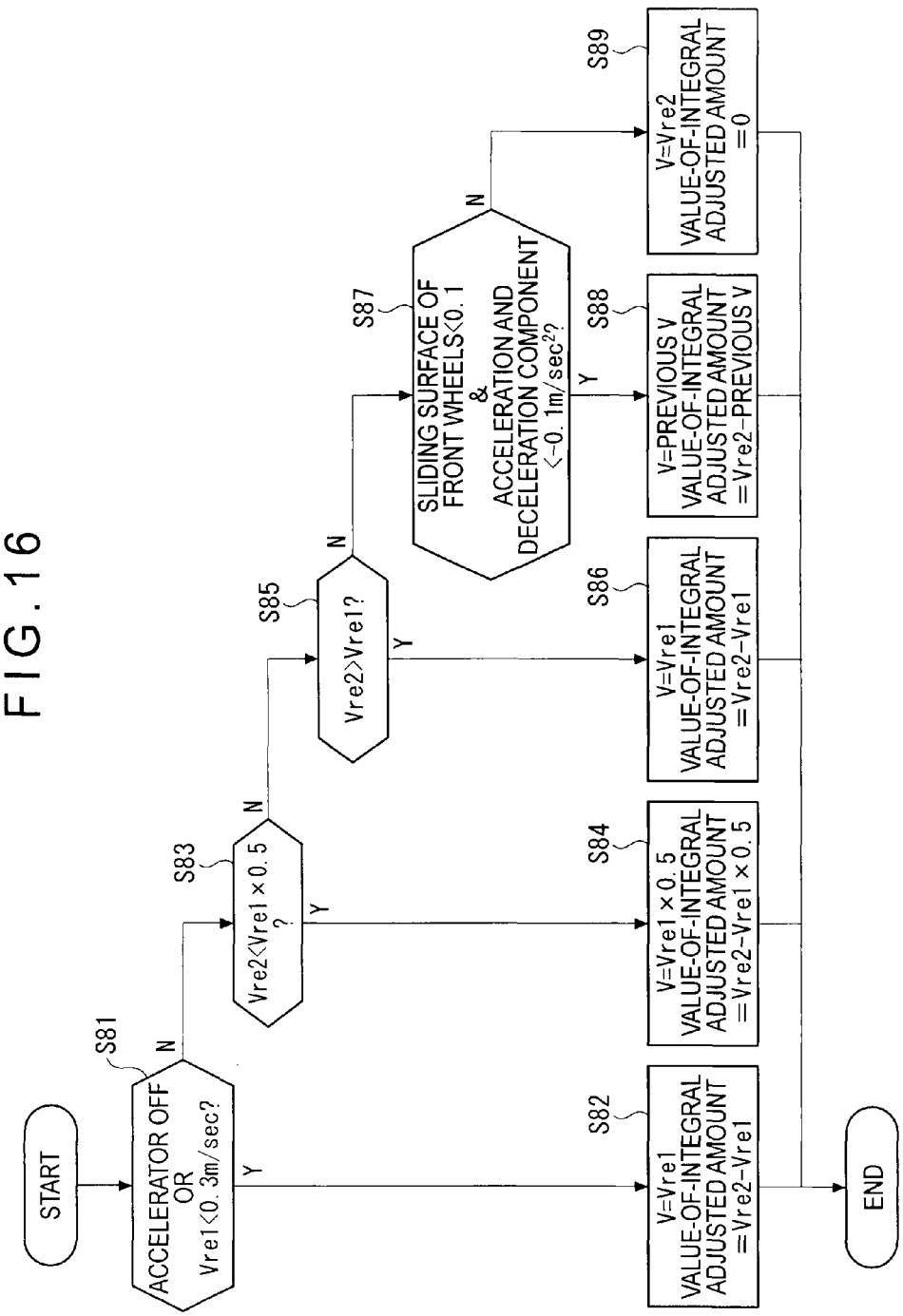
FIG. 16 is a flowchart for illustrating a vehicle speed estimation processing by the vehicle speed estimation unit in the exemplary embodiment.

The vehicle speed estimation unit 805 executes the reference speed adjustment processing S8, which is specifically the processing shown in the flowchart of FIG. 16.

First, the vehicle speed estimation unit 805 determines whether the acceleration is OFF or the reference wheel speed Vre1 is less than 0.3 msec (Step S81).

When either of the conditions in Step S81 is satisfied, the vehicle speed estimation unit 805 determines that the vehicle is not skidding. The vehicle speed estimation unit 805 sets the estimated vehicle speed V at the reference vehicle speed Vre1 and sets an amount provided by subtracting the reference vehicle speed Vre1 from the reference speed Vre2 as a value-of-integral adjusted amount (Step S82).

When the conditions in Step S81 are not satisfied, the vehicle speed estimation unit 805 determines whether the reference speed Vre2 is less than a predetermined value (e.g., less than half) of the reference vehicle speed Vre1 (Step S83).

When the condition in Step S83 is satisfied, the vehicle speed estimation unit 805 determines that, when the estimated vehicle speed V is excessively low, braking may be excessively applied in the TCS braking control, and sets the estimated vehicle speed V at, for instance, half of the reference vehicle speed Vre1 and sets an amount provided by subtracting half of the reference vehicle speed Vre1 from the reference speed Vre2 as a value-of-integral adjusted amount (Step S84).

When the condition in Step S83 is not satisfied, the vehicle speed estimation unit 805 determines whether the reference speed Vre2 is higher than the reference vehicle speed Vre1 (Step S85).

When the condition in Step S85 is satisfied, the vehicle speed estimation unit 805 determines that the estimated vehicle speed V does not exceed the reference vehicle speed Vre1. The vehicle speed estimation unit 805 sets the estimated vehicle speed V at Vre1 and sets an amount provided by subtracting the reference vehicle speed Vre1 from the reference speed Vre2 as a value-of-integral adjusted amount (Step S86).

When the condition in Step S85 is not satisfied, the vehicle speed estimation unit 805 determines whether the control deviations S of all the wheels calculated by the braking mechanism controller according to the equitation (3) are less than 0.1 and the acceleration and deceleration component is less than −0.1 m/sec$^2$ (Step S87).

When the conditions in Step S87 are satisfied, the vehicle speed estimation unit 805 determines that, when reducing a vehicle speed in spite of the control deviations S being in an appropriate range, the control deviations S may be further increased to cause an increase in a brake force by the braking mechanism control to further reduce the vehicle speed. Accordingly, the vehicle speed estimation unit 805 sets the estimated vehicle speed V at the previously estimated vehicle speed V and sets an amount provided by subtracting the previously estimated vehicle speed V from the reference speed Vre2 as a value-of-integral adjusted amount (Step S88).

When the conditions in Step S87 are not satisfied, the vehicle speed estimation unit 805 sets the reference speed Vre2 calculated by the reference speed calculator 802 as the estimated vehicle speed V (Step S89).

The invention is not limited to the above-described exemplary embodiment, but is applicable to the following.

Specifically, the above-described vehicle speed estimator 80 is applied to an articulate-type dump truck 1, however, an application of the invention is not limited thereto. More specifically, the invention is applicable to a rigid-type dump truck. Moreover, the invention is applicable to not only a dump truck but also a construction vehicle provided with wheels such as those of a wheel loader.

In the above exemplary embodiment, the vehicle speed estimator 80 is used for estimating the vehicle speed provided by the TCS control. However, the invention may be used for estimating the vehicle speed provided by an ABS control of all-wheel-drive construction vehicles.

Specific structures and configurations of the invention may be altered in use in any manner as long as an object of the invention is achieved.

The invention claimed is:

1. A traction control apparatus, comprising:
a vehicle speed estimator that estimates a vehicle speed of a construction vehicle, the vehicle speed estimator comprising a rotation speed detector that detects a rotation speed of each of driving wheels of the construction vehicle and a reference wheel-speed calculator that calculates a reference wheel-speed based on the rotation speed detected by the rotation speed detector;
a driving-force controller that performs a driving-force control of the construction vehicle based on the vehicle speed estimated by the vehicle speed estimator, the driving-force controller comprising a braking mechanism controller that calculates an actual slip ratio of each of the wheels based on the rotation speed detected by the rotation speed detector and controls a braking mechanism of the construction vehicle so that the calculated actual slip ratio of each of the wheels converges to a predetermined target slip ratio;
a vehicle state determiner that determines whether or not the vehicle speed of the construction vehicle estimated by the vehicle speed estimator and the driving-force control by the driving-force controller are balanced based on deviations between each of the calculated actual slip ratios and the target slip ratio; and
a driving-force control changer that changes a driving-force control by the driving-force controller based upon a determination by the vehicle state determiner that the vehicle speed and the driving-force control are unbalanced,
wherein the vehicle state determiner is configured to determine that the vehicle speed and the driving-force control are unbalanced based on the slip ratios of both right and left ones of the wheels calculated by the braking mechanism controller being a predetermined threshold or less, and
wherein the braking mechanism controller is configured to keep an amount of braking control by the braking mechanism at the predetermined threshold or more for a predetermined time or more.

2. The traction control apparatus according to claim 1, wherein
the driving-force control changer changes the driving-force control by setting the vehicle speed estimated by the vehicle speed estimator at the reference wheel speed calculated by the reference wheel-speed calculator.

3. The traction control apparatus according to claim 1, wherein
the driving-force control changer changes the driving-force control by releasing the control by the driving-force controller.

4. A traction control method, comprising:
estimating a vehicle speed of a construction vehicle, detecting a rotation speed of each of driving wheels of the construction vehicle, and calculating a reference wheel-speed based on the detected rotation speed;
performing a driving-force control of the construction vehicle based on the estimated vehicle speed, calculating an actual slip ratio of each of the wheels based on the detected rotation speed, and controlling a braking mechanism of the construction vehicle so that the calculated actual slip ratio of each of the wheels converges to a predetermined target slip ratio;
determining whether or not the estimated vehicle speed and the driving-force control are balanced based on deviations between each of the calculated actual slip ratios and the target slip ratio; and
changing the driving-force control based upon a determination that the vehicle speed and the driving-force control are unbalanced,
wherein determining that the vehicle speed and the driving-force control are unbalanced is based upon a determination that the slip ratios of right and left ones of the wheels are both at a predetermined threshold or less and that an amount of braking control is kept at the predetermined threshold or more for a predetermined time or more.

5. The traction control method according to claim 4, wherein
changing the driving-force control includes setting the estimated vehicle speed at the calculated reference wheel speed.

6. The traction control method according to claim 4, wherein
changing the driving-force control includes releasing the control.

7. A traction control apparatus, comprising:
a vehicle speed estimator that estimates a vehicle speed of a construction vehicle, the vehicle speed estimator comprising a rotation speed detector that detects a rotation speed of each of driving wheels of the construction vehicle and a reference wheel-speed calculator that calculates a reference wheel-speed based on the rotation speed detected by the rotation speed detector;
a driving-force controller that performs a driving-force control of the construction vehicle based on the vehicle speed estimated by the vehicle speed estimator, the driving-force controller comprising a braking mechanism controller that calculates an actual slip ratio of each of the wheels based on the rotation speed detected by the rotation speed detector and controls a braking mechanism of the construction vehicle so that the calculated actual slip ratio converges to a predetermined target slip ratio;
a vehicle state determiner that determines whether or not the vehicle speed of the construction vehicle estimated by the vehicle speed estimator and the driving-force control by the driving-force controller are balanced based on a deviation between the calculated actual slip ratio and the target slip ratio; and
a driving-force control changer that changes a driving-force control by the driving-force controller when the vehicle state determiner determines that the vehicle speed and the driving-force control are unbalanced,
wherein the vehicle state determiner determines the vehicle speed and the driving-force control to be unbalanced when the slip ratios of right and left ones of the wheels calculated by the braking mechanism controller are both at a predetermined threshold or less, and the braking control amount of the braking mechanism by the braking mechanism controller is kept at the predetermined threshold or more for a predetermined time or more.

* * * * *